US008060467B1

(12) United States Patent  (10) Patent No.: US 8,060,467 B1
Laura  (45) Date of Patent: Nov. 15, 2011

(54) ON-LINE ACCOUNT MANAGEMENT SYSTEM HAVING A SYNCHRONIZED ACCOUNT INFORMATION DATA STORE

(75) Inventor: Joseph G. Laura, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 3352 days.

(21) Appl. No.: 10/331,427

(22) Filed: Dec. 30, 2002

(51) Int. Cl.
G06F 17/00 (2006.01)
(52) U.S. Cl. .......... 707/610; 707/609; 707/618; 705/30
(58) Field of Classification Search .................... 705/33, 705/30
See application file for complete search history.

(56) References Cited

U.S. PATENT DOCUMENTS

| | | | |
|---|---|---|---|
| 5,084,833 A | 1/1992 | Matsuda et al. | |
| 5,627,979 A | 5/1997 | Chang et al. | |
| 5,806,065 A | 9/1998 | Lomet | |
| 5,963,925 A * | 10/1999 | Kolling et al. | 705/40 |
| 6,092,071 A | 7/2000 | Bolan et al. | |
| 6,385,616 B1 | 5/2002 | Gardner | |
| 6,493,685 B1 | 12/2002 | Ensel et al. | |
| 6,578,015 B1 | 6/2003 | Haseltine et al. | |
| 6,587,924 B2 | 7/2003 | Arimilli et al. | |
| 6,738,866 B2 | 5/2004 | Ting | |
| 7,031,956 B1 | 4/2006 | Lee et al. | |
| 7,051,041 B1 | 5/2006 | Miller | |
| 2001/0025262 A1* | 9/2001 | Ahmed | 705/33 |
| 2002/0029250 A1 | 3/2002 | Reiner | |
| 2002/0077977 A1 | 6/2002 | Neely et al. | |
| 2003/0191711 A1 | 10/2003 | Jamison et al. | |
| 2003/0204420 A1 | 10/2003 | Wilkes et al. | |
| 2004/0064789 A1 | 4/2004 | Krausz et al. | |
| 2004/0073533 A1 | 4/2004 | Mynarski et al. | |
| 2005/0216421 A1 | 9/2005 | Barry et al. | |

OTHER PUBLICATIONS

King, Richard et al., Management of a Remote Backup Copy for Disaster Recovery, ACM Transactions on Database Systems, vol. 16, No. 2, Jun. 1991, pp. 338-368.*
Gait, Jason, Phoenix: A Safe In-Memory File System, Communications of the ACM, Jan. 1990, vol. 33, No. 1, pp. 81-86.*
Office Action dated Jul. 11, 2007 for U.S. Appl. No. 10/331,318 (17 pages).
Office Action dated Jul. 3, 2007 for U.S. Appl. No. 10/331,376 (20 pages).
Appel, Andrew W., "Simple generational garbage collection and fast allocation," Department of Computer Science, Princeton University, Princeton, New Jersey, Sep. 1988, pp. 1-16.

(Continued)

Primary Examiner — Rajesh Khattar
Assistant Examiner — Carol See

(57) ABSTRACT

A system and method for on-line management of account information by customers of a provider of goods or services. A web server receives billing information from a telecommunications service provider in a standardized XML-format readily suitable for viewing by the customers. The system further includes a tiered storage system for maintaining invoices of the customers. Recent invoices are maintained in an upper tier of the storage system where they are accessible to customers over the Internet. As the invoices age, an archival and retrieval application periodically transfers the invoices to an intermediate tier where they may only be accessed by the archival and retrieval application using an index maintained in the upper tier. Account receivable information is also available on-line through the web site. The available account receivable information is continuously synchronized with corresponding information maintained by the service provider using a synchronization application which minimizes traffic therebetween.

10 Claims, 10 Drawing Sheets

OTHER PUBLICATIONS

Hjaltason, Gisli R., et al., "Distance browsing in spatial databases," Jun. 1, 1999, pp. 1-40, ACM Transactions on Database Systems, © Gale Group, Inc. and Association for Computing Machinery, Inc.

Interview Summary dated Aug. 16, 2007 (3 pages), U.S. Appl. No. 10/331,376, filed Dec. 30, 2002.

Interview Summary dated Sep. 11, 2007 (2 pages), U.S. Appl. No. 10/331,318, filed Dec. 30, 2002.

Interview Summary dated May 22, 2008 (2 pages), U.S. Appl. No. 10/331,376, filed Dec. 30, 2002.

Interview Summary dated Aug. 27, 2008 (2 pages), U.S. Appl. No. 10/331,318, filed Dec. 30, 2002.

Interview Summary dated Sep. 16, 2008 (2 pages), U.S. Appl. No. 10/331,318, filed Dec. 30, 2002.

Nilsen, Kelvin, "Taking out the garbage," Mar. 2002, pp. 43, 44, 46, 48, and 50, Embedded Systems Programming.

Notice of Allowance dated Jan. 14, 2010 (20 pages), U.S. Appl. No. 10/331,376, filed on Dec. 30, 2002.

Office Action (Final) dated Nov. 19, 2007 (30 pages), U.S. Appl. No. 10/331,376, filed Dec. 30, 2002.

Office Action dated Dec. 12, 2007 (23 pages), U.S. Appl. No. 10/331,318, filed Dec. 30, 2002.

Office Action dated Feb. 21, 2008 (23 pages), U.S. Appl. No. 10/331,376, filed Dec. 30, 2002.

Office Action (Final) dated Jun. 20, 2008 (22 pages), U.S. Appl. No. 10/331,318, filed Dec. 30, 2002.

Office Action dated Jul. 9, 2008 (22 pages), U.S. Appl. No. 10/331,376, filed Dec. 30, 2002.

Office Action dated Sep. 25, 2008 (70 pages), U.S. Appl. No. 10/331,318, filed Dec. 30, 2002.

Office Action (Final) dated Mar. 17, 2009 (38 pages), U.S. Appl. No. 10/331,318, filed Dec. 30, 2002.

Office Action dated May 27, 2009 (30 pages), U.S. Appl. No. 10/331,376, filed Dec. 30, 2002.

Office Action dated Jun. 4, 2009 (62 pages), U.S. Appl. No. 10/331,318, filed Dec. 30, 2002.

Office Action (Final) dated Dec. 11, 2009 (31 pages), U.S. Appl. No. 10/331,318, filed Dec. 30, 2002.

Provisional patent application entitled "Integrated customer interface system for communications network management," by Carol Devine, et al., filed Sep. 26, 1997 as U.S. Appl. No. 60/060,655.

Provisional patent application entitled "Medical delivery and information management system for use in health care facilities," by Gordon J. Wilkes, et al., filed Apr. 30, 2002 as U.S. Appl. No. 60/377,027.

Provisional patent application entitled "Invoice markup language: a detailed description," by Frank Gordon Krausz, et al., filed Jul. 10, 2002 as U.S. Appl. No. 60/394,984.

* cited by examiner

ON-LINE ACCOUNT MANAGEMENT SYSTEM HAVING A SYNCHRONIZED ACCOUNT INFORMATION DATA STORE

CROSS-REFERENCE TO RELATED APPLICATIONS

This application is related to co-pending U.S. patent application Ser. Nos. 10/331,376 entitled "On-Line Account Management System Having A Tiered Account Information Storage System" and 10/331,318 entitled "Method For Transporting Billing Information To An On-Line Account Management System", both of which were filed on even date herewith, assigned to the Assignee of the present application and hereby incorporated by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a system and method for synchronizing account information available on-line with the account information maintained internally by a provider of goods or services and, more particularly, to a system and method which identifies changes to the internally maintained account information and initiates the transfer of appropriate updates to the account information data maintained on-line. By using updates, the volume of traffic resulting from the synchronization process is reduced.

BACKGROUND OF THE INVENTION

Traditionally, telecommunication service providers and other corporate entities have maintained account information for their subscribers or other customers on an internal enterprise network typically configured to include a mainframe or other large scale computing device in which the account information was maintained and plural client computing devices capable of accessing information maintained on the mainframe. In contrast with a traditionally configured limited access enterprise network such as the one herein described, the Internet is a vast, publicly accessible computer network comprised of a wide variety of disparate computing devices operated by an equally disparate group of computer users. These computing devices are interconnected by various connection media which communicate using the transmission control protocol/Internet protocol ("TCP/IP") set of communication protocols.

In recent years, it has become increasingly commonplace for commercial enterprises such as corporations to interconnect their limited access enterprise network with the Internet. The purpose of such interconnections was two-fold—to enable the users of the enterprise network access to resources available through the Internet and to enable external computer users to access selected resources of the enterprise network through the Internet through a computer system commonly referred to as a web server. As the corporate web server became more common, information which was traditionally maintained on the mainframe where it could only be accessed by employees through the enterprise network began to migrate onto the web server. As a result, while a web server typically maintains publicly available content, oftentimes, it will also maintain content for which access is limited to authorized users. For example, a telecommunications service provider may have a web site which provides general information on its services within a publicly accessible portion of the site while allowing existing account holders to access confidential information, typically, their personal account information, within a limited access portion of the site to which unrelated third parties are barred.

Early web sites were quite rudimentary, with only a limited amount of functionality available to the accessing subscriber. As the web sites became more sophisticated, however, additional subscriber functionality was added to the sites. Similarly, as subscribers became more "web-savvy", their expectations of what subscriber functionality should be available at the sites grew. Over time, it became common for a web site to allow a subscriber to review invoices, update subscriber information and make payments on-line. However, certain limitations have prevented web sites from performing these and other tasks effectively. For example, to place invoices on-line, it was common for the service provider to employ software which electronically searches through text images of the printed invoices for information of interest, captures selected information from the text images of the printed invoices and reformat the captured information to create electronic invoices. This technique is both complex and difficult to maintain. For example, if the name of a product or service is changed, the software employed by the service provider must be updated in order to be able to continue to capture invoice information associated with the re-named product or service.

It also became desirable for the service provider to place account receivable ("A/R") information on the web site. Unlike invoice information which, once generated, remains unchanged, A/R information is constantly updated. For example, a subscriber may be billed on the first of the month, receive a partial credit for a wrong number on the tenth of the month and pay the balance owed on their account on the twentieth of the month. Thus, any A/R information to be maintained on the web site must be constantly updated by the mainframe in order to be accurate. Otherwise, the subscriber accessing A/R information through the web site would view outdated information. However, a significant amount of resources may be consumed by the heavy traffic resulting from the constant updating or "synchronizing" necessary such that the A/R information residing on the web server matches that residing on the mainframe.

Another problem with maintaining invoice, A/R and similar types of subscriber information on the web site relates to the substantial consumption of memory resources at the web site which results from maintaining these types of subscriber information at the web site. For example, a service provider typically generates a new invoice for each customer on a monthly basis. It should be readily appreciated, therefore, that maintaining invoice information on-line will quickly consume the available memory resources, particularly if the service provider has hundreds of thousands of subscribers. To conserve existing memory resources and avoid the added expense of additional memory resources, many web sites which maintain invoice information on-line will typically limit the number of months of invoice information available over the web. For example, many sites limit available invoice information to only two months and will delete aged invoice information to free space for newer invoice information. While such an approach both keeps the information which tends to be of most interest to subscribers while restraining the cost of maintaining invoice information on-line, it does limit the usefulness of the web site since subscribers interested in older invoices are forced to contact a representative of the service provider capable of retrieving the desired invoice information off the mainframe computer system.

By configuring a computer network such that A/R information residing on the web server can remain synchronized with A/R information residing on the mainframe without generating an excessive amount of traffic therebetween, a current obstacle to the migration of A/R information to the web server could be lessened or eliminated. It is, therefore, the object of the invention to provide a computer network capable of synchronizing information in such a manner.

SUMMARY OF THE INVENTION

In one embodiment, the present invention is directed to a method of synchronizing account records maintained on a first computer system with account records maintained on a second computer system coupled to the first computer system. In accordance with the claimed method, the first computer system transmits a baseline account records data file containing current account information for a plurality of accounts to the second computer system. There, the received baseline account record data file is maintained as a current account records database. The first computer system then constructs an updates file from additional account information obtained subsequent to the transmission of the baseline account records data file to the second computer system. The constructed updates file is comprised of updated account information for each one of the plurality of accounts for which a change in the current account information maintained in the baseline account records data file is detected. The first computer system transmits the updates file to the second computer system. The second computer system then updates the current account records database using the updated account information contained in the updates file. In one aspect of this embodiment of the invention, the first computer system constructs the updates file by first identifying updated account information by comparing the baseline account records data file to an account records data file constructed using updated account information and then constructing the updates file from the identified updated account information.

In another embodiment, the present invention is directed to a method of synchronizing account records maintained, by a provider of goods or services to customers, on a first computer system with account records maintained on a second computer system coupled to the first computer system and viewable by the customers of the provider over a network. In accordance with the claimed method, a baseline account records data file containing current account information for at least one customer is transmitted to the second computer system by the first computer system. The received baseline account records data file is maintained, by the second computer system, as an on-line account records database. The first computer system then constructs an updates file from additional account information obtained subsequent to the transmission of the baseline account records data file to the second computer system. The updates file constructed by the first computer system is comprised of updated account information for each one of the customers for which a change in the current account information maintained in the baseline account records data file is detected by the first computer system. The updates file is then transmitted to the second computer system where the updated account information contained therein is used to update the on-line account records database.

In one aspect thereof, when constructing an updates file from additional account information obtained subsequent to the transmission of the baseline account records data file to the second computer system, the first computer system identifies updated account information by comparing the baseline account records data file to an updated account records data file. The first computer system then constructs the updates file from the identified updated account information. In a further aspect thereof, the first computer system constructs the baseline account records data file from a current A/R data file for the customers of the provider and a list of those customers who have subscribed, with the provider, for on-line viewing of account records. In this aspect, the customers who have subscribed for on-line viewing of account records are a subset of the customers of the provider. In still another further aspect thereof, the first computer system is a mainframe computer, the second computer system is a web server, the mainframe computer is coupled to the web server by an enterprise network operated by the provider and the account records maintained on the web server are viewable, over the Internet, by the customers who have subscribed for on-line viewing of account records.

In still another embodiment, the present invention is directed to a computer network which includes first and second computer systems coupled to one another. Residing on a processor subsystem of the first computer system is a first synchronization application which initiates synchronization of a current account records data file maintained in a memory subsystem of the second computer system with a current account records data file maintained in a memory subsystem of the first computer system such that the current account records data files mirror one another. Residing on a processor subsystem of the second computer system is an account management application which enables customers to view account records maintained in the memory subsystem of the second computer system and synchronized with corresponding account records maintained in the memory subsystem of the first computer system. In one aspect of this embodiment, a second synchronization application, residing on the processor subsystem of the second computer system, completes synchronization of the current records data file maintained in the memory subsystem of the second computer system with the current records data file maintained in the memory subsystem of the first computer system.

In a further aspect of this embodiment of the invention, a subscriber data file containing a list of customers who have subscribed to on-line viewing of account records is maintained in the memory subsystem of the first computer system. In this aspect, the first synchronizing application determines a baseline account records data file from the list of subscribers and current A/R records for the customers of the provider. The first synchronizing application then writes the baseline account records data file to the current account records data file of the memory subsystem of the first computer system and transmits the baseline account records data file to the second synchronizing application. The second synchronizing application then writes the received baseline account records data file to the current account records data file of the memory subsystem of the second computer system.

In still another aspect of this embodiment of the invention, the memory subsystem of the first computer system also maintains a prior account records data file to which the first synchronizing application copies the current account records data file upon construction of a next current account records data file from the list of subscribers and a next current A/R data file which contains A/R transactions received subsequent to the first synchronizing application transmitting the baseline account records data file to the second synchronizing application. In this aspect, updates to the current account records data file are determined, by the first synchronizing application, by comparing the current account records data file to the prior account records data file.

In still further aspects thereof, an updated account records data file is also maintained in the memory subsystem of the first computer system. In this aspect, the first synchronizing application writes determined updates to the current account records data file to the updated account records data file. In yet another aspect thereof, the first synchronizing application transmits the updated account records data file to the second synchronization application where the received data file is used to update the current account records data file maintained in the memory subsystem of the second computer system.

DETAILED DESCRIPTION OF THE INVENTION

Figure 1:
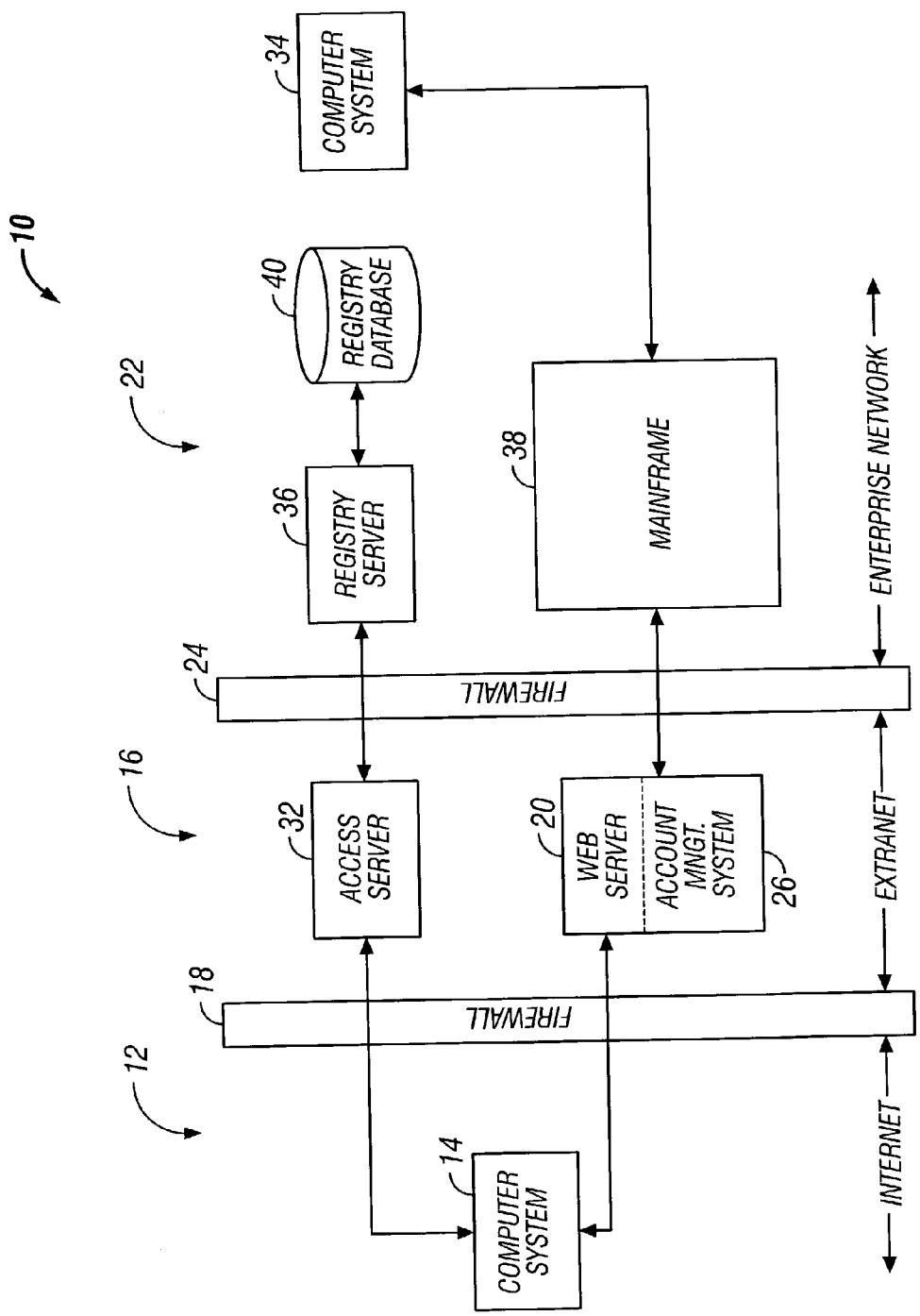
FIG. 1 is a block diagram of a computer network which includes an on-line account management system constructed in accordance with the teachings of the present invention.

FIG. 1 shows a computer network 10 which includes an on-line account management system constructed in accordance with the teachings of the present invention. As disclosed herein, the computer network 10 is configured as a multi-tiered network which includes an unsecured network 12 within which a computer user operating a computer system 14 may freely operate, a limited access network 16, protected from the unsecured network 12 by a first firewall 18, which includes a computer system, for example, a web server 20, containing information which the computer user may access if properly authorized but is otherwise inaccessible to unauthorized users within the unsecured computer network 12, and a secured network 22, protected from the limited access network 16 by a second firewall 24, inaccessible to users operating within the unsecured network 12.

In the example illustrated herein, the unsecured network 12 is the Internet, the limited access network 16 is an extranet and the secured network 22 is an intranet, for example, an enterprise network. It should be noted that, as illustrated herein, the limited access network 16 includes computer systems, for example, the web server 20, more commonly considered to form part of the Internet 12. As used herein, however, a computer system configured to limit access to at least a portion of the content maintained thereby to authorized users is deemed to form part of an extranet operated by the content provider. Furthermore, it is fully contemplated that the invention disclosed herein is suitable for use within a wide variety of computer networks for which access to a first portion thereof is limited to a subset of the group of users having access to a second portion of the network. Thus, the invention is suitable for use within a wide variety of computer networks, including those fully or partially comprised of any combination of one or more local area networks ("LANs"), wide area networks ("WANs"), intranets, extranets and virtual private networks ("VPNs").

In the embodiment of the invention disclosed herein, the limited access network 16 and the secured network 22 are operated by a telecommunications service provider. It should be clearly understood, however, that the disclosure of the invention in connection with a telecommunications service provider is purely by way of example and that the limited access network 16 and the secured network 22 may be operated by various types of business entities or other organizations which function as a provider of goods or services to others. In further accordance with the embodiment of the invention disclosed herein, the computer system 14 is operated by a customer with whom the telecommunications service provider will periodically conduct business transactions which are documented by one or more account records created and maintained by the telecommunications service provider. As will be more fully described below, in order to facilitate the ability of the customer to review and/or otherwise manage their account, the telecommunications service provider or other provider has provided certain account management functionality to the web server 20 where it is available to customers on-line over the Internet. As many of the account records to be made available to customers on-line are confidential, it is contemplated that those customers of the telecommunications service provider who wish to avail themselves of the available on-line account management services must first subscribe to those services. As a result, access to confidential account records may be limited to authorized individuals. Variously, it is contemplated that a customer may subscribe to the on-line account management services via a written request transmitted by hand or mail, a verbal request transmitted in person or telephonically or an electronic request transmitted via the Internet. Once a customer has subscribed to the on-line management services, the customer would be able to access various type of records related to an account or accounts that the customer maintains with the telecommunications service provider and/or otherwise manage their accounts in accordance with the techniques hereinbelow described.

The computer system 14, for example, a personal computer ("PC"), is coupled to the unsecured computer network 12 by a communication link (not shown). Variously, the communication link may include an analog or digital dial-up connection, a digital subscriber line ("DSL"), a cable modem or a dedicated circuit. Of course, by way of example, FIG. 1 shows a single PC 14 coupled to the unsecured computer network 12. More typically, however, many more PCs (or other types of computer systems) would be coupled to the unsecured computer network 12. A user accesses the unsecured computer network 12 using access software (not shown) residing on the PC 14. For example, if the unsecured computer network 12 is the Internet or another computer network using the TCP/IP set of communication protocols, suitable access software would include a commercially available web browser, for example, Microsoft Explorer or Netscape Navigator.

Using the web browser, a user may view content maintained at a web server (not shown) located within the unsecured computer network 12 or, if desired, may view content maintained at the web server 20 located within the limited access network 16. Typically, the web server 20 may have one or more mirrored servers (not shown), the number of which varies depending on the number and/or geographical distribution of users seeking to access the content identically maintained in both the web server 20 and the mirrored servers thereof. As disclosed herein, the web server 20 maintains two types of content—unrestricted and restricted. Unrestricted content may be viewed by all users accessing the web server 20 while restricted content is limited to viewing by authenticated users who have been authorized to view the restricted content. Authentication is the process of verifying a user's identity while authorization is the process of restricting the resources that an individual can access after the authentication of the user has been accepted. To access content maintained at the web server 20, a user operating the PC 14 would provide the browser with the universal resource locator ("URL") address for the limited access network 16. In turn, the browser would navigate to the limited access network 16 where a load balancer (not shown) would direct the browser to either the web server 20 (or a selected mirrored server thereof) where unrestricted content is downloaded to the browser for display, most typically, as a web page at the PC 14. If the user operating the PC 14 later seeks to view restricted content, for example, if the user issues a request to the web server 20 to use an account management system 26 residing in the web server 20 to view invoice and/or A/R information, the user shall first be re-directed to a new location for initiation of authentication and/or authorization processes.

To perform the aforementioned authentication and/or authorization processes, the limited access network 16 further includes an access server 32. The access server 32 has an access service (not shown) which interacts, in a manner to be more fully described below, with various computer systems forming part of the secured network 22. While a single access server 32 is shown in FIG. 1, the number of access servers needed to support the web server 20 and the mirrored servers thereof will vary based upon a number of factors, among them, the number of web servers to be supported and the frequency at which the web servers require the services of an access server. Upon issuing a request to view restricted content, a second load balancer (also not shown) would select one of the access servers, for example, the access server 32, to perform the authentication and/or authorization processes. The second load balancer would then re-direct the browser from the web server 20 to the access server 32.

While a wide variety of authentication and/or authorization processes are known in the art and many such processes would be suitable for the disclosed purpose of restricting access to selected content to authenticated users who have been authorized to view that content, such authentication and/or authorization processes typically involve the user operating the PC 14 to provide the access server 32 with requested information, for example, an account number and a password. Upon receiving the requested information from the user, the access server 32 executes an authentication and/or authorization session using the access service to verify the user's identity and to determine whether the user is authorized to view the requested content. Of course, many authentication and/or authorization services are more sophisticated than the rudimentary session described herein.

As may be further seen in FIG. 1, the service provider providing content via the web server 20 uses a multi-tier authentication and/or authorization process in which a portion of the process is executed within the secured enterprise network 22 which, as previously set forth, is protected from access by third parties by the second firewall 24. More specifically, when executing the authentication and/or authorization process, the access service residing on the access server 32 utilizes an authentication and authorization ("AAR") service (not shown) residing on a registry server 36 and information stored on a registry database 40 to complete the authentication and/or authorization process. In addition to the AAR service, the registry server 36 also has a session management ("SM") service (not shown) residing thereon. As will be more fully described below, the SM service works in conjunction with the AAR service during the authentication and/or authorization process. Again, it should be noted that, while FIG. 1 shows a single registry server 36, it is contemplated that the number of registry servers 36 needed to support the access server 32 and the mirrored servers thereof will vary based upon a number of factors, among them, the frequency at which the access service of the access server 32 and a runtime service (not shown) residing on the web server 20 require the services of the registry server 36. Of course, it should be clearly understood that the foregoing description of the various services residing on the web server 20, the access server 32 and the registry server 36 has been greatly simplified for ease of description and it is specifically contemplated that a number of other services which reside on the web server 20, the access server 32 or the registry server 36 have been omitted for ease of description.

During the authentication and/or authorization process, a password and/or other information is provided to the access server 32 by a user of the computer system 14. In turn, the provided information is transported by the access service of the access server 32 to a registry server, for example, the registry server 36, selected by a third load balancer (not shown). The AAR service residing on the registry server 36 then checks the password and/or other information provided by the user against encrypted data stored in the registry database 40. After the AAR service authenticates a user based upon a comparison of the password and/or other information provided by the user against encrypted data stored in the registry database 40 and determines a list of authorized privileges for the authenticated user, the AAR service will ask the SM service to assign a session ID and encryption key for the user. The SM service creates a new session and returns a session ID to the access service residing on the access server 32 which provided the information to the registry server 36. To complete the login process, the access server 32 writes cookies back to the browser residing on the PC 14 that contains the session ID, user ID and encryption key. The browser is then redirected back to the web server 20 to continue the session. Now, however, the information contained in the cookies returned to the browser will enable the user to view the restricted content to which access had previously been sought.

Having been authorized to do so, the user may now use the account management system 26 residing in the web server 20 to perform a variety of tasks, for example, to view invoice and/or A/R information for their account. In accordance with the teachings of the present invention, various account management functionality has migrated from a mainframe system 38 forming part of the enterprise network 22 to the account management system 26 residing in the web server 20 forming part of the extranet 16. By enabling the migration of the disclosed account management, functionality which heretofore was only accessible to users within the enterprise network 22, for example, by a user of computer system 34, may now be accessed by authorized users from the Internet 12. While account management functionality has migrated from the mainframe system 38 to the account management system 26 residing in the web server 20, the mainframe system 38 must still support the account management system 26.

Figure 2:
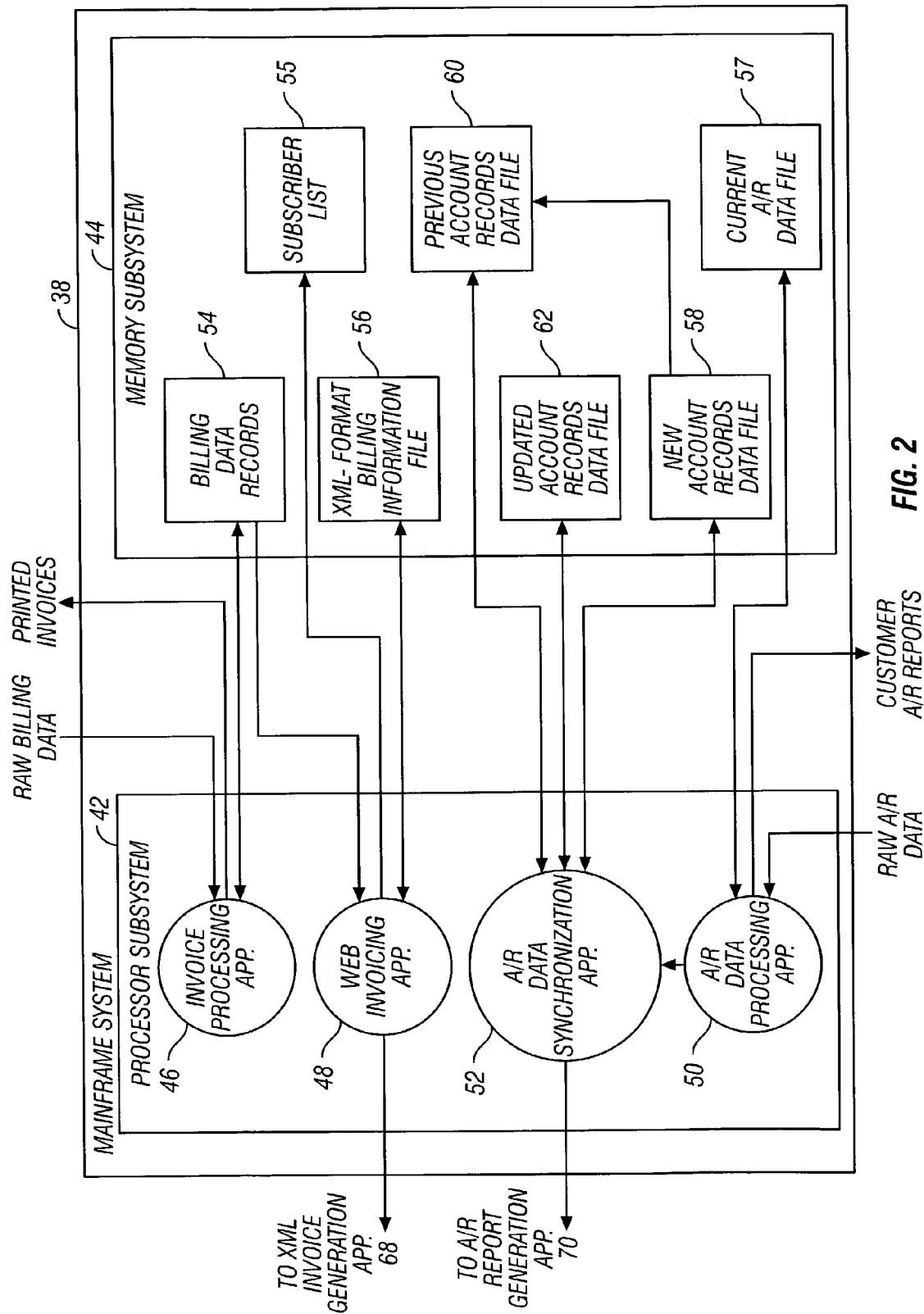
FIG. 2 is an expanded block diagram of a mainframe computer system forming part of the computer network of FIG. 1 and supporting the on-line account management system thereof.

Referring next to FIG. 2, functionality within the mainframe system 38 which supports the account management system 26 will now be described in greater detail. As may now be seen, the mainframe system 38 is comprised of a processor subsystem 42 coupled to a memory subsystem 44. As used herein, the term "processor subsystem" refers to the collective processing capacity of the mainframe system 38 and is intended to encompass both the central processing unit ("CPU") as well as any other processing unit, for example, a coprocessor, residing within the mainframe system 38. Similarly, the term "memory subsystem" refers to the collective memory capacity of the mainframe system 38 and is intended to encompass the main memory, auxiliary memory as well as any other memory unit residing within the mainframe system 38. Of course, it should be clearly understood that the mainframe system 38 has been greatly simplified for ease of description and that numerous components thereof have been omitted from the drawing.

Residing in the processor subsystem 42 are a first (or "invoice processing") application 46, a second (or "web invoicing") application 48, a third (or "A/R data processing") application 50 and a fourth application (or "A/R data synchronization") application 52. Each one of the applications 46 through 52 is a software application comprised of a series of instructions encoded in the memory subsystem 44 of the mainframe system 38 as computer readable program code and executable by the processor subsystem 42 of the mainframe system 38. Of course, it should be clearly understood that many other applications typically reside in the mainframe system 38 and that these other applications have been omitted from FIG. 2 for ease of description. The memory subsystem 44 is subdivided into plural data spaces, each of which maintains a different type of information. The spaces include a first data space 54 in which billing data records are maintained, a second data space 56 in which an extensible markup language format (or "XML-format") billing information file is maintained, a third data space 58 in which a new A/R data file is maintained, a fourth data space 60 in which a previous A/R data file is maintained and a fifth data space 62 in which an updated A/R data file is maintained. Of course, it should again be clearly understood that, in addition to the aforementioned data records and/or files, the memory subsystem 44 typically maintains a considerable amount of other data to support processing and/or data storage functionality other than the specific processing and/or data storage functionality disclosed herein.

Figure 3:
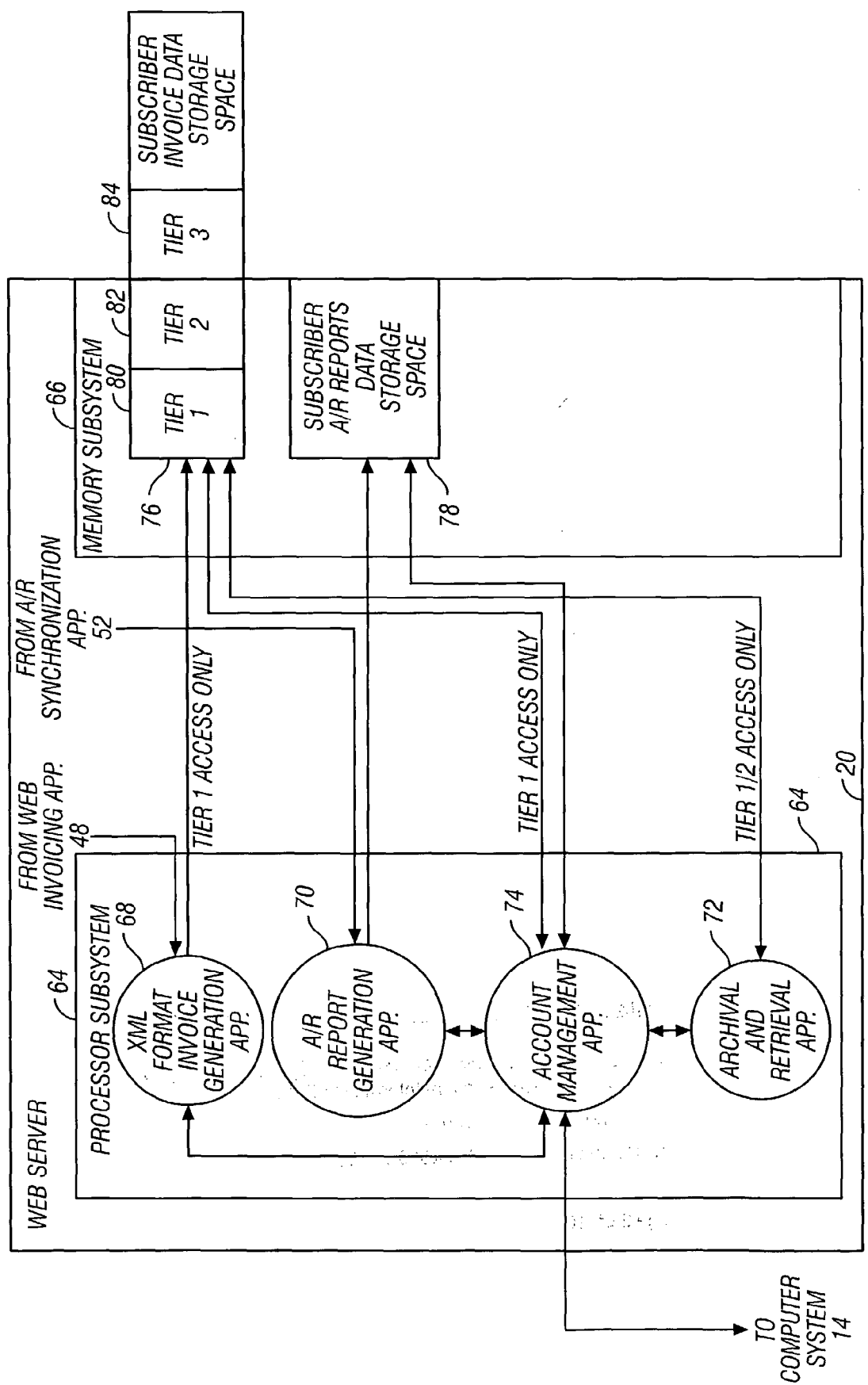
FIG. 3 is an expanded block diagram of the on-line account management system of FIG. 1.

Referring next to FIG. 3, functionality within the web server 20 which collectively forms the account management system 26 will now be described in greater detail. As may now be seen, the web server 20 is comprised of a processor subsystem 64 coupled to a memory subsystem 66. Again, as used herein, the term "processor subsystem" refers to the collective processing capacity of the web server 20 and is intended to encompass both the central processing unit ("CPU") as well as any other processing unit, for example, a coprocessor, residing within the web server 20. Similarly, the term "memory subsystem" refers to the collective memory capacity of the web server 20 and is intended to encompass the main memory, auxiliary memory as well as any other memory unit residing within the web server 20. Of course, it should be clearly understood that the web server 20 has been greatly simplified for ease of description and that numerous components thereof have been omitted from the drawing.

Residing in the processor subsystem 64 are a first (or "XML-format invoice generation") application 68, a second (or "A/R report generation") application 70, a third (or "archival and retrieval") application 72 and a fourth (or "account management") application 74. Each one of the applications 68 through 74 is a software application comprised of a series of instructions encoded in the memory subsystem 66 of the web server 20 as computer readable program code and executable by the processor subsystem 64 of the web server 20. Of course, it should be clearly understood that many other applications typically reside in the web server 20 and that these other applications have been omitted from FIG. 3 for ease of description. The memory subsystem 66 is subdivided into plural data spaces, each of which maintains a different type of information. The plural data spaces include a first data space 76 in which subscriber invoices are maintained and a second data space 78 in which subscriber A/R reports are maintained. Of course, it should again be clearly understood that, in addition to the aforementioned subscriber invoices and subscriber A/R reports, the memory subsystem 66 typically maintains a considerable amount of other data to support processing and/or data storage functionality other than the specific processing and/or data storage functionality disclosed herein.

The first data space 76 in which subscriber invoices are maintained is a tiered memory subsystem which includes a first (or "upper") tier 80, a second (or "intermediate") tier 82 and a third (or "lower") tier 84. As will be more fully described below, each tier 80, 82 and 84 maintains a respective subset of the set of invoices generated by the XML-format invoice generation application 68. The upper tier 80 also maintains an index to the invoices maintained in the intermediate tier 82. Invoices are written to the upper tier 80 by the XML-format invoice generation application 68. Once written to the upper tier 80, the invoices maintained thereat are accessible by the account management application 74 and the archival and retrieval application 72. Invoices maintained in the intermediate tier 82, however, may only be accessed by the archival and retrieval application 72. The lower tier 84 of the tiered memory subsystem is not physically located within the memory subsystem 66 of the web server 20. Rather, the lower tier 84 is a magnetic tape or other removable storage medium which may be temporarily coupled to the web server 20, for example, by inserting the magnetic tape into a tape drive (not shown) forming part of the of the web server 20 and transferring invoices from the intermediate tier 82 onto the magnetic tape. Alternately, the lower tier 84 may be a remotely located device coupled to the web server 20 over a network.

Figures 1, 4:
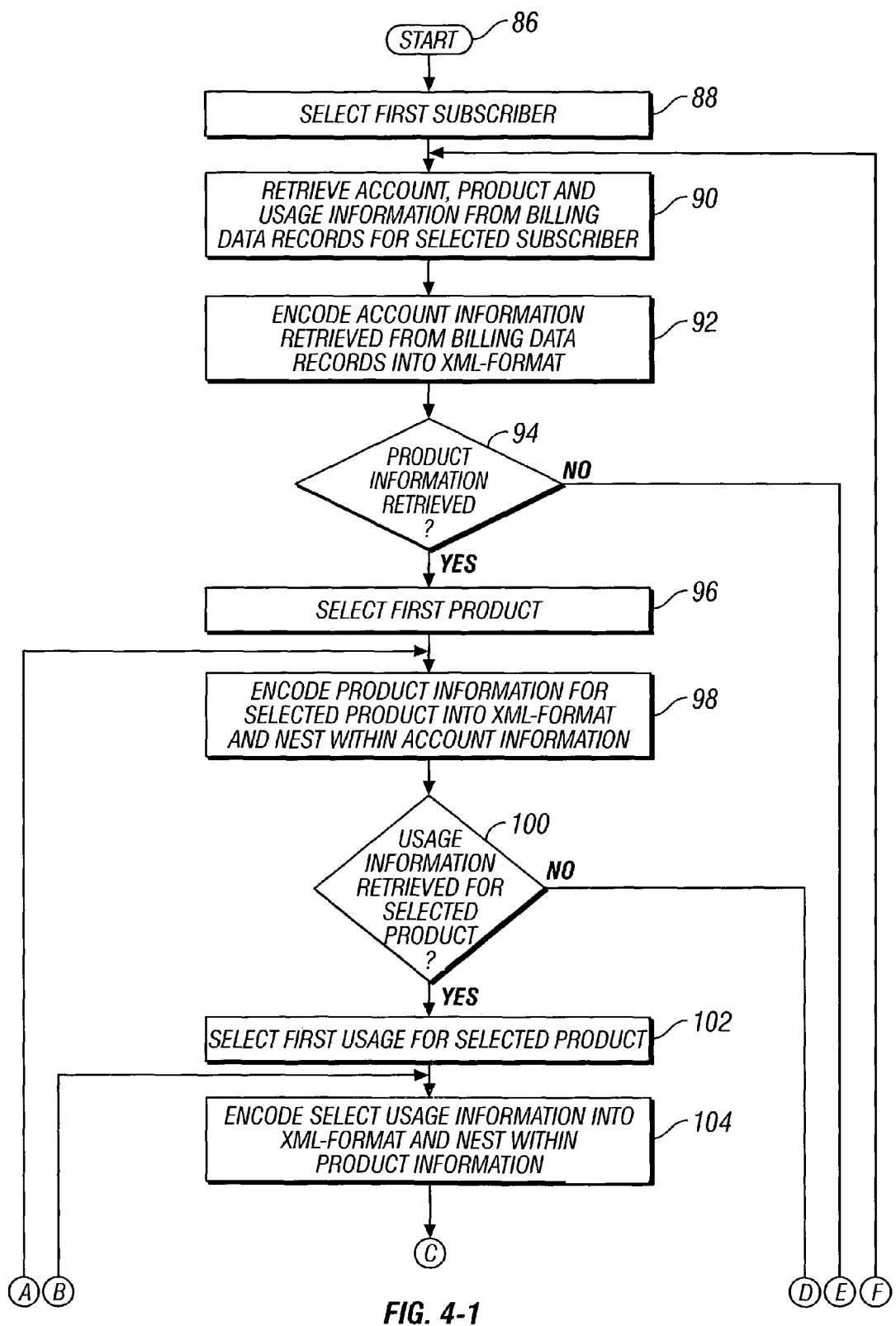
FIG. 4 is a flowchart of a method of transporting billing information configured into a standardized format.
Figures 2, 4:
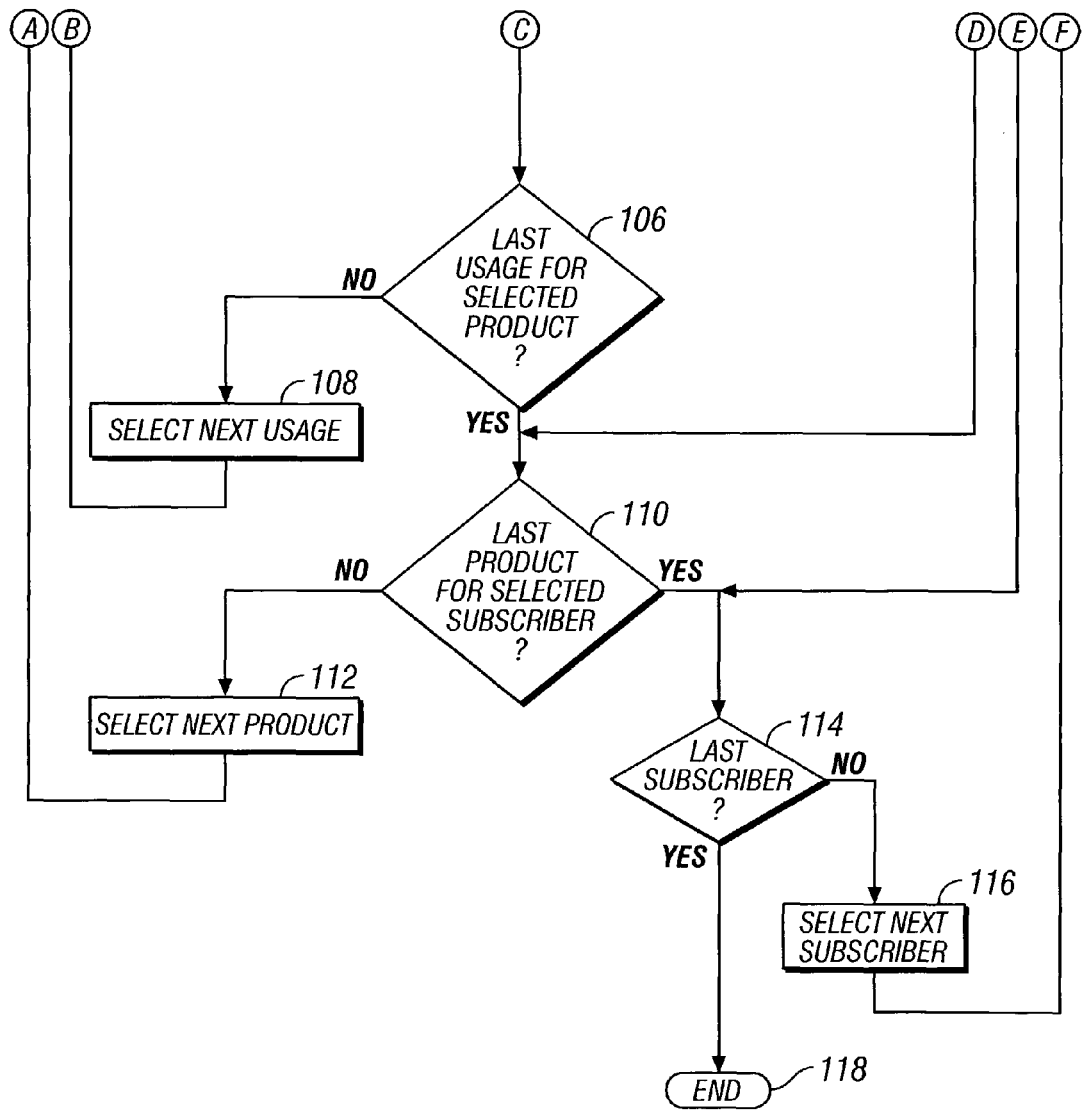

Referring next to FIG. 4, a method of transporting billing information contained in the billing data records maintained in the data space 54 of the memory subsystem 44 of the mainframe system 38 to the account management system 26 residing in the web server 20 in a standardized format, for example, XML-format, suitable for viewing by a user of the computer system 14 over the Internet 12 will now be described in greater detail. Prior to commencing the method illustrated in FIG. 4, raw billing data for a provider of goods and/or services, for example, a telecommunications service provider, is input the invoice processing application 46. Variously, the raw billing data may be retrieved from a raw billing data space (not shown) located within the memory subsystem 44 or transmitted to the invoice processing application 46 by the computer system 34 or other device (not shown) forming part of the enterprise network 22. From the raw billing data received thereby, the invoice processing application 46 assembles plural billing data records for storage in the data space 54. The invoice processing application also generates plural invoices in a fixed medium, typically, a print medium, for forwarding to customers, most commonly, by mailing paper copies of the printed invoices to the customers.

As disclosed herein, the billing data records contain account, product and usage information for each customer of the provider of goods and/or services. In addition to an alphanumeric code which uniquely identifies a customer, the account information for a customer may include information such as the customer's name and mailing address. Product information will identify those goods and/or services purchased by the customer. For example, if telecommunication services are being provided to a customer, the associated product information may include the calling plan or plans to which the customer has enrolled and the rate or rates at which the customer will be charged for various types of telephone calls made under the calling plan or plans. Usage information identifies each usage of the products or services purchased by the customer. For example, if a customer has subscribed to a calling plan offered by a telecommunications service provider, usage information may include each telephone number called by the customer. The usage information may also include the date, time and duration of each call made by the customer. Of course, it should be clearly understood that the billing data records need not necessarily include account, product and/or usage information for the customer. Rather, it is noted that the billing data records may include types of information other than those specifically recited herein. Furthermore, when the billing data records do include account, product and/or usage information, it should be clearly understood that the particular types of account, product and/or usage information disclosed herein may or may not be included as part of that information. Rather, it is fully contemplated that various types of account, product and/or usage information are entirely suitable for the purposes disclosed herein.

The method commences at step 86. At step 86, it is presumed that the web server 20 is powered up and accessible to computer users, for example, a user of the computer system 14 via the Internet 12. It is further presumed that the account management application 74 and the XML-format invoice generation application 68 have been launched and are ready to begin executing operations. As previously described, at this step is the process, the data space 54 of the memory subsystem 66 of the mainframe system 38 contains billing data records for plural customers of a provider of goods or services. As disclosed herein, the provider is a long distance telecommunications service provider and, as further disclosed herein, for each customer of the telecommunications service provider, the billing records contain account information which uniquely identifies the customer, product information which describes the various types of services purchased by the customer and usage information which details each usage of each service purchased by the customer. However, because this information is spread over multiple files and record types defined in accordance with a proprietary format, third parties lacking knowledge of the proprietary format would find it difficult to obtain the account, product and usage information for a customer from the billing data records maintained in the data space 54.

From the start at step 86, the method proceeds to step 88 where the web invoicing application 48 selects a first subscriber from a list of subscribers maintained in a sixth data space 55 of the memory subsystem 44 of the mainframe system 38. As defined herein, a subscriber is a customer of the telecommunications service provider who has requested that selected account information, for example, invoice information and/or A/R information, be placed onto the web server 20 where it may be accessed, by the subscriber over the Internet 12. Continuing on to step 90, account, product and usage information for the selected subscriber is retrieved from the billing data records maintained in the first data space 54 by the web invoicing application 48 and, at step 92, the retrieved account information is encoded into XML-format. Generally, XML is a technology where data elements are encased (or "wrapped") in a document type definition (or "DTD") which surrounds each data element. For example, if an account information data element indicates that the account number for a customer is 123456789, once encased, the corresponding account information data element would appear as follows: <account-number>123456789</account-number>. Accordingly, at step 92, each data element of the retrieved account information is encased in a DTD which describes that data element. The method then proceeds on to step 94 for determination if the information retrieved from the first data space 54 includes product information for the selected subscriber. If it is determined at step 94 that the retrieved information includes product information for the selected subscriber, the method proceeds to step 96 where a first product is selected from the retrieved product information.

Proceeding on to step 98, the product information for the selected product is encoded into XML-format, again by encasing each data element thereof into a DTD which describes that data element. The XML-format product information for the selected product is then nested within the account information encoded into XML-format at step 92. Continuing on to step 100, the information retrieved from the first data space 54 is examined to determine if it includes usage information for the selected product. If so, the method proceeds to step 102 where a first usage of the selected product is selected and on to step 104 where the usage information for the selected usage is encoded into XML-format, again by encasing each data element thereof into a DTD which describes that data element. The XML-format product information for the selected usage is then nested within the product information encoded into XML-format at step 98.

Continuing on to step 106, the method examines the information retrieved from the first data space 54 to determine if the selected usage is the last usage for the selected product. If there are additional usages of the selected product contained in the information retrieved from the first data space 54, the method proceeds to step 108 where a next usage of the selected product is selected. The method then returns to step 104 for further processing in the manner previously described. If, however, it is determined at step 106 that the selected usage is the last usage of the selected product or if it was determined at step 100 that the information retrieved from the first data space 54 does not contain any usage information for the selected product, the method will instead proceed to step 110 for further processing.

At step 110, the information retrieved from the first data space 54 is again examined, this time to determine if the selected product is the last product for the selected subscriber. If it is determined that there are additional products for the selected subscriber, the method proceeds to step 112 where a next product is selected for the selected subscriber. The method would then return to step 98 for further processing in the manner previously described. If, however, it is determined at step 110 that the selected product is the last product for the selected subscriber or if was determined at step 94 that the information retrieved from the first data space 54 does not contain any product information for the selected subscriber, the method will instead proceed to step 114 for further processing.

At step 114, the web invoicing application 48 will again examine the subscriber list maintained in the sixth data space 55 to determine if there are additional subscribers for which information needs to be retrieved from the first data space 54 is. If there are additional subscribers for which billing information should be retrieved from the first data space 54, the method proceeds to step 116 where a next subscriber is selected. The method then returns to step 90 for further processing in the manner previously described. If, however, it is determined at step 114 that the selected subscriber is the last subscriber for which billing information was retrieved from the first data space 54, the method will instead end at step 118.

By executing the above-described method, a series of XML-format billing information files, each corresponding to a customer of the telecommunications service provider who has requested that invoice information for their accounts be available over the Internet 12, are constructed. These billing information files are also termed as "integrated" billing information files since they not only contain plural types of invoice information but also a series of relationships between the plural types of invoice information contained therein. These relationships are created by wrapping data blocks within descriptions of the contents of the data blocks and nesting types of invoice information within other types of invoice information. For example, in the exemplary integrated billing information file reproduced below, not only can each call made under an "ANYTIME" calling plan be readily identified but specific items regarding each such call, for example, call duration, are equally identifiable.

Once constructed, the web invoicing application 48 stores the integrated XML-format billing information files in the second data space 56. When ready for transfer to the XML-format invoice generation application 68 residing at the web server 20, for example, when an integrated XML-format billing information file has been constructed for each customer who has subscribed to on-line billing information access, the web invoicing application 48 will compress the integrated XML-format billing information files, for example, using a conventional data compression algorithm, and subsequently transfer the compressed integrated XML-format billing information files to the XML-format invoice generation application 68 residing at the web server 20 using a conventional file transfer protocol (or "FTP") process. For example, as an integrated XML-format billing information file is constructed for a selected subscriber, the web invoice application 48 may write the newly constructed integrated XML-format billing information file to the second data space 56. A typical integrated XML-format billing information file containing wrapped usage information nested within wrapped product information nested within wrapped account information is configured as follows:

```
-<account-block>
   <account-number>XXXXXXXXX</account-number>
-<account-detail>
-<charge-block>
-<description>
   <line>SPRINT CHARGES</line>
   </description>
-<charge-class>
-<description>
   <line>AOL 5[ANYTIME PROVIDED BY SPRINT<line>
   </description>
-<charge-subclass>
-<description>
   <line>State-to-State</line>
   </description>
   <line-seq-nbr>A</line-seq-nbr>
   <calls>000000002</calls>
   <minutes>00000000000400</minutes>
   <amount>0.20</amount>
   </charge-subclass>
   </charge-class>
-<other-charge-class>
-<description>
   <line>LONG DISTANCE MONTHLY CHARGES</line>
   </description>
-<other-charge-subclass>
-<description>
   <line>AOL/SPRINT LONG DISTANCE MONTHLY FEE</line>
   </description>
   <line-seq-nbr>J</line-seq-nbr>
   <amount>2.80<amount>
   </other-charge-subclass>
   </other-charge-class>
   </charge-block>
-<tax-reg-block>
-<description>
   <line>TAXES/REG. RELATED CHGS.</line>
   </description>
-<tax-reg-class>
-<description>
   <line>STATE SALES TAX</line>
   </description>
   <amount>0.02</amount>
   </tax-reg-class>
-<tax-reg-class>
-<description>
   <line>STATE SALES TAX</line>
   </description>
   <amount>0.22</amount>
   </tax-reg-class>
-<tax-reg-class>
-<description>
   <line>CARRIER UNIVERSAL SVC CHG</line>
   </description>
   <amount>0.30</amount>
   </tax-reg-class>
-<tax-reg-class>
-<description>
   <line>CARRIER PROPERTY TAX</line>
   </description>
   <amount>0.03</amount>
   </tax-reg-class>
-<tax-reg-class>
-<description>
   <line>FEDERAL EXCISE TAX</line>
   </description>
   <amount>0.09</amount>
   </tax-reg-class>
   </tax-reg-block>
   </account-detail>
-<itemization>
-<itemization-calls>
-<description>
   <line>ITEMIZATION OF CALLS</line>
   </description>
   <footer2> For a description of rate periods, please see terms and conditions.</footer2>
```

```
-<call-block>
    <block-id>1</block-id>
-<orig-foncard>
-<description>
    <line>ORIGINATING NUMBER:</line>
    </description>
    <number>XXXXXXXXXX</number>
    </orig-foncard>
-<serv-block>
-<call>
    <call-id>1</call-id>
-<date>
    <julian>2002053</julian>
    <display>Feb. 22, 2002</display>
    </date>
-<time>
    <hms>1248390</hms>
    <display>12:48 PM</display>
    </time>
    <period>D</period>
-<location>
    <city>NEWORLEANS</city>
    <state>LA</state>
    </location>
    <called-number>XXXXXXXXXX</called-number>
    <seconds>00000000120</seconds>
    <amount>0.10</amount>
-<taxes>
-<fed-taxes>
    <amount>0.00</amount>
    </fed-taxes>
-<surchg-taxes>
    <amount>0.01</amount>
    </surchg-taxes>
-<state-taxes>
    <amount>0.01</amount>
    </state-taxes>
-<total-taxes>
    <amount>0.02</amount>
    </total-taxes>
    </taxes>
    </call>
-<call>
    <call-id>2</call-id>
-<date>
    <julian>2002058</julian>
    <display>Feb. 27, 2002</display>
    </date>
-<time>
    <hms>1444000</hms>
    <display>2:44 PM</display>
    </time>
    <period>D</period>
-<location>
    <city>NEWORLEANS</city>
    <state>LA</state>
    </location>
    <called-number>XXXXXXXXXX</called-number>
    <seconds>00000000120</seconds>
    <amount>0.10</amount>
-<taxes>
-<fed-taxes>
    <amount>0.00</amount>
    </fed-taxes>
-<surchg-taxes>
    <amount>0.01</amount>
    </surchg-taxes>
-<state-taxes>
    <amount>0.01</amount>
    </state-taxes>
-<total-taxes>
    <amount>0.02</amount>
    </total-taxes>
    </taxes>
    </call>
    </serv-block>
    </call-block>
    </itemization-calls>
    </itemization>
    </account-block>
-<hier-block>
-<multiple-account-summary>
-<description>
    <line>MULTIPLE ACCOUNT SUMMARY</line>
    </description>
-<service-location>
    <customer-name>XXXX XXXXXXX</customer-name>
-<description>
    <line>AOL 5[ANYTIME PROVIDED BY SPRINT]</line>
    </description>
    <account-number>XXXXXXXXX</account-number>
-<standard-charges>
    <amount>3.00</amount>
    </standard-charges>
-<discounts>
    <amount>0.00</amount>
    </discounts>
-<taxes-reg-charges>
    <amount>0.66</amount>
    </taxes-reg-charges>
-<total-charges>
    <amount>3.66</amount>
    </total-charges>
    </service-location>
    <service-location>
    <customer-name>XXXX XXXXXXX</customer-name>
-<description>
    <line>SPRINT FONCARD UPGRADE</line>
    </description>
    <account-number>XXXXXXXXX</account-number>
-<standard-charges>
    <amount>0.47</amount>
    </standard-charges>
-<discounts>
    <amount>0.00</amount>
    </discounts>
-<taxes-reg-charges>
    <amount>0.12</amount>
    </taxes-reg-charges>
-<total-charges>
    <amount>0.59</amount>
    </total-charges>
    </service-location>
    </multiple-account-summary>
    </hier-block>
-<account-summary>
-<summary-charges>
-<description>
    <line>Summary of Charges</line>
    </description>
-<section-total>
-<description>
    <line>Balance</line>
```

```
      <line>Forward</line>
    </description>
    <amount>0.00</amount>
  </section-total>
-<section-total>
-<description>
    <line>Account</line>
    <line>Adjustments</line>
  </description>
  <amount>0.00</amount>
</section-total>
-<section-total>
-<description>
    <line>SPRINT</line>
    <line>Charges</line>
  </description>
  <amount>3.47</amount>
</section-total>
-<section-total>
-<description>
    <line>Taxes and<line>
    <line>Regulatory</line>
    <line>Rel. Charges</line>
  </description>
  <amount>0.78<amount>
</section-total>
-<section-total>
-<description>
    <line>Current</line>
    <line>Total</line>
  </description>
  <amount>4.25<amount>
</section-total>
-<section-total>
-<description>
    <line>Amount</line>
    <line>Due By </line>
    <fine>Mar. 23, 2002<line>
  </description>
  <amount>4.25</amount>
</section-total>
</summary-charges>
</account-summary>
-<puc-messages>
-<message>
-<description>
    <line>MESSAGE TO SPRINT/EARTHLINK CUSTOMERS</line>
    <line>$5.95 SAVINGS FOR EARTHLINK INTERNET AND SPRINT LONG</line>
    <line>DISTANCE JOINT CUSTOMERS.</line>
    <line>FOR TAX APPLICATION AND REPORTING PURPOSES, THE MONTHLY</line>
    <line>CHARGE HAS BEEN ALLOCATED AMONG IT'S APPLICABLE</line>
    <line>COMPONENTS (LONG DISTANCE AND INTERNET)</line>
  </description>
</message>
</puc-messages>
```

It should be noted that, in the above-reproduced exemplary integrated XML-format billing information file, confidential information such as names, account numbers and telephone numbers have been masked from view.

Once received at the web server 20, the XML-format invoice generation application 68 constructs a series of XML-format invoices from the received integrated XML-format billing files by applying a template to the received integrated XML-format billing files. The XML-format invoice generation application 68 then writes the constructed XML-format invoices to the upper tier 80 of the first memory space 76 of the memory subsystem 66 of the web server 20 in a manner to be more fully described with respect to FIG. 6, below.

In the foregoing description, the web invoicing application 48 goes down the list of subscribers contained in the sixth data space 55, selects, in sequence, each subscriber for which billing information has not yet been retrieved from the first data space 54, retrieves account, product and usage information for the selected subscriber from the billing data records maintained in the first data space 54, subsequently encodes the retrieved account, product and usage information therefore in a nested XML-format and writes the encoded account product and usage information to the second data space 56 as an integrated XML-format billing information file. Of course, it should be clearly understood that the foregoing process may be executed in a wide variety of manners. For example, after selecting a subscriber, the web invoicing application 48 may retrieve only the account information for the selected subscriber. After encoding the selected account information in XML-format, the web invoicing application 48 may then retrieve the product information for the selected subscriber from the first data space 54 for encoding into XML-format and subsequent nesting within the account information. Finally, the web invoicing application 48 may retrieve the usage information for the selected subscriber from the first data space 54, again for encoding in XML-format and nesting within the product information. Alternately, the web invoicing application 48 may initially retrieve the usage information for the selected subscriber and subsequently retrieve the product information. The product information would then be used to encapsulate the usage information. Similarly, subsequently retrieved account information would be used to encapsulate the product information.

Like all customers, subscribers will periodically receive an invoice for services provided thereto by the telecommunications service provider in a non-electronic format, for example, a paper bill mailed to the subscriber. However, the subscriber may also view, over the Internet, a copy of that invoice in an electronic format. The subscriber may then choose to pay a selected one of the two copies of the invoice.

Figure 5:
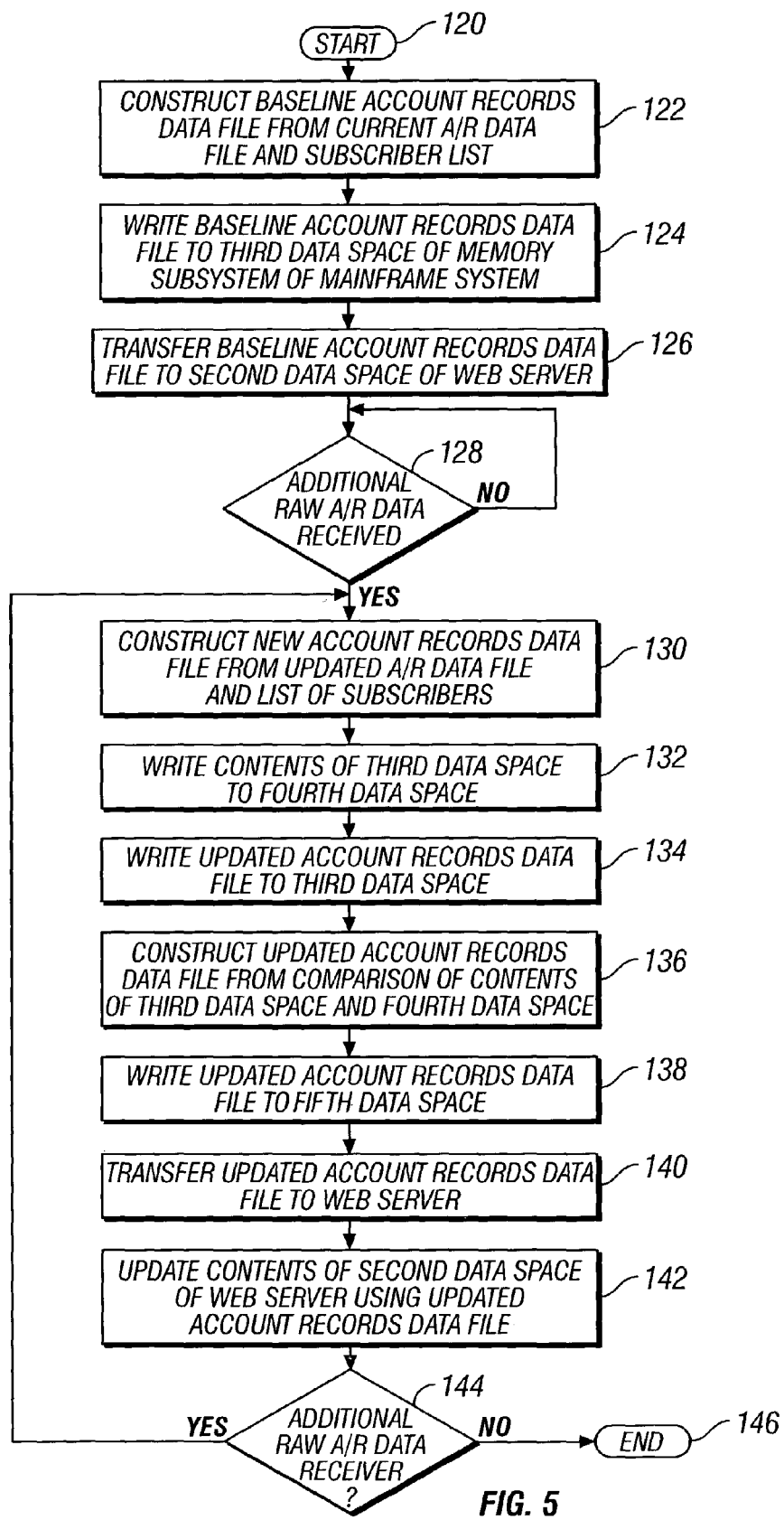
FIG. 5 is a flow chart illustrating a method of synchronizing account information maintained on-line with internally maintained account information.

Referring next to FIG. 5, a method of synchronizing account information maintained on-line with internally maintained account information will now be described in greater detail. In the embodiment of the invention disclosed herein, A/R information maintained on a web server is synchronized with A/R information maintained on a mainframe system. It should be clearly understood, however, that the methods disclosed herein are equally suitable for synchronizing other types of information maintained on plural computer systems such that the information on each one of the plural computer systems is the same. Prior to commencement of the method, raw A/R data for a provider of goods and/or services, for example, a telecommunications service provider, is input the A/R data processing application 50. Variously, the raw A/R data may be retrieved from a raw A/R data space (not shown) located within the memory subsystem 44 or transmitted to the A/R data processing application 50 by the computer system 34 or other device (not shown) forming part of the enterprise network 22. From the raw A/R data received thereby, the A/R data processing application 50 assembles a current A/R data file containing a plurality of A/R reports, each identifying a customer of the provider of goods and/or services and a description of activity on an account assigned to that customer. Typically, activity on an account will include, among other items, a list of charges assessed to the account and payments made on the account. The A/R data processing application 50 will generate a series of customer A/R reports for use by the service provider. The A/R data processing application 50 will also store the current A/R data file in a seventh data space 57 of the memory subsystem 44.

The method commences at step 120. At step 120, it is again presumed that the web server 20 is powered up and accessible to computer users, for example, a user of the computer system 14 via the Internet 12. It is further presumed that the account management application 74 and the A/R report generation application 70 have been launched and are ready to begin executing operations. At step 122, the A/R data processing application 50 passes the current A/R data file maintained in the seventh data space 57 to the A/R data synchronization application 52. In turn, the A/R data synchronization application 52 constructs a baseline account records data file from the received current A/R data file and the list of subscribers maintained in the sixth data space 55 of the memory subsystem 44 of the mainframe system 38. As previously set forth, a subscriber is a customer of the telecommunications service provider who has requested that selected account information, for example, invoice information and/or A/R information, be placed onto the web server 20 where it may be accessed, by the subscriber over the Internet 12. To construct the baseline account records data file, each A/R report in the current A/R data file which corresponds to a subscriber identified on the list of subscribers is added as an A/R report of the baseline account records data file.

After constructing the baseline account records data file, the method proceeds to step 124 where the A/R data synchronization application 52 writes the baseline account records data file to the third data space 58 in the memory subsystem 44 of the mainframe system 38 where it is maintained as a "new" account records data file containing a series of subscriber A/R reports. Continuing on to step 126, the A/R data synchronization application 52 then transmits the baseline account records data file maintained in the third data space 58 of the memory subsystem 44 to the A/R report generation application 70 of the web server 20 using a conventional FTP process. In turn, the A/R report generation application 70 writes the received baseline account records data file to the second data storage space 78 of the memory subsystem 66 of the web server 20 where it is similarly maintained as a series of subscriber A/R reports.

In accordance with the teachings of the present invention, the A/R data synchronization application 52 residing at the mainframe system 38 and the A/R report generation application 70 residing at the web server 20 collectively operate to ensure that the subscriber A/R reports maintained in the third data space 58 of the memory subsystem 44 of the mainframe system 38 as the new account records data file match the subscriber A/R reports maintained in the second data storage space 78 of the memory subsystem 66 of the web server 20. So long as the subscriber A/R reports maintained at the mainframe system 38 match the subscriber A/R reports maintained at the web server 20, the mainframe system 38 and the web server 20 are said to be synchronized with one another. A loss of synchronization will occur, however, when the subscriber A/R reports maintained at the mainframe system 38 no longer match the subscriber A/R reports maintained at the web server 20. Such a loss will occur whenever one or more of the subscriber A/R reports maintained at the mainframe system 38 changes relative to the subscriber A/R reports maintained at the web server 20.

Proceeding on to step 128, the method looks for the arrival of additional raw A/R data at the mainframe system 38. Typically, additional raw A/R data will be periodically input the mainframe system 38, for example, once every 24 hours. As before, the additional raw A/R data may be retrieved from a raw A/R data space (not shown) located within the memory subsystem 44 of the mainframe system 38 or transmitted to the A/R data processing application 50 by the computer system 34 or other device (not shown) forming part of the enterprise network 22. The additional raw A/R data contains A/R information for each customer of the service provider for whom a new A/R-related transaction, for example, a payment on an account, was recorded during the subject time period. Upon receipt of the additional raw A/R data by the A/R data processing application 50 of the mainframe system 38, the A/R data processing application 50 will construct an updated A/R data file from the current A/R data file maintained in the seventh data space 57 and the additional raw A/R data. The updated A/R data file will then be used to generate a new series of customer A/R reports, again for use by the service provider. The updated A/R data file will also be written to the seventh data space 57 of the memory subsystem 66 as the current A/R data file.

Similar to the current A/R data file generated by the A/R data processing application 50, the updated A/R data file contains a plurality of A/R reports, each identifying a customer of the provider of goods and/or services and a description of activity on an account assigned to that customer. The updated A/R data file differs from the current A/R data file, however, in that it now reflects activity which occurred in the last 24 hours. Upon completing the construction thereof, the A/R data processing application 50 passes the updated A/R data file to the A/R data synchronization application 52. In turn, the A/R data synchronization application 52 begins construction of an updated account records data file. To construct an updated account records data file, the A/R data synchronization application 52 must first construct a next "new" account records data file.

Proceeding on to step 130, the A/R data synchronization application 53 constructs a next "new" account records data file. To do so, the A/R data synchronization application 52 again retrieves the subscriber list maintained in the sixth data space 55 of the memory subsystem 44 and constructs the next "new" account records data file using each A/R report in the updated A/R data file which corresponds to a subscriber identified on the list of subscribers. The method will then proceed to step 132 where A/R data synchronization application 52 transfers the "new" account records data file maintained in the third data space 58 to the fourth data space where it will be maintained as a "previous" account records data file. Continuing on to step 134, the A/R data synchronization application 52 writes the next "new" account records data file to the third data space 58 where it will be maintained as the "new" account records data file.

At this point, the subscriber A/R reports maintained in the second data storage space 78 of the memory subsystem 66 of the web server 20 are no longer synchronized with the subscriber A/R reports contained in the "new" account records data file maintained in the third data space 58 of the memory subsystem 44 of the mainframe system 38. However, as will be more fully described below, re-synchronization of the two may be established relatively quickly.

To re-synchronize the two, the method proceeds to step 136 where the A/R data synchronization application 52 constructs an "updated" account records data file comprised of the differences identified by comparing the "new" account records data file maintained in the third data space 58 to the "previous" account records data file maintained in the fourth data space 60. Continuing on to step 138, the constructed updated account records data file which contains the differences between the A/R reports contained in the "new" account records data file and the A/R reports contained in the "previous" account records is written to the fifth data space 62 as the "updated" account records data file. As the "updated" account records data file contains only those differences between the contents of the third data space 58 and the fourth data space 60, the "updated" account records data file will typically be considerably smaller than either the "new" or "previous" account records data files.

The method then proceeds to step 140 where the A/R data synchronization application 52 transfers the "updated" account records data file to the A/R report generation application 70 using a conventional FTP process. As the "updated" account records data file contains only changes between the subscriber A/R reports contained in the "new" account records data file and the "previous" account records data file, the "updated" account records data file will generate much less traffic than when the baseline account records data file was transferred to the A/R report generation application 70 as part of step 126. In turn, at step 142, the A/R report generation application 70 updates the subscriber A/R reports maintained in the second data storage space 78 using the information contained in the received "updated" account records data file. By doing so, the A/R report generation application 70 has resynchronized the subscriber A/R reports maintained in the second data storage space 78 of the memory subsystem 66 of the web server 20 with the subscriber A/R reports maintained in the third data space 58 of the memory subsystem 44 of the mainframe system 38. By maintaining synchronization of the subscriber A/R reports maintained in the second data storage space 78 of the memory subsystem 66 of the web server 20 with the subscriber A/R reports maintained in the third data space 58 of the memory subsystem 44 of the mainframe system 38, when a customer who has subscribed, with the service provider, to view A/R information accesses A/R information for the account assigned to that subscriber using the account management application 74, the customer will view A/R information which is identical to the A/R information maintained for that customer on the mainframe system 34.

Continuing on to step 144, the A/R data processing application 50 awaits the arrival of additional raw A/R data at the mainframe system 38. If additional raw A/R data is received by the A/R data processing application 50 at step 144, the method returns to step 130 for further processing in the manner previously described. If, however, no additional raw A/R data is received by the A/R data processing application 50, the method ends at step 146.

Figure 6:
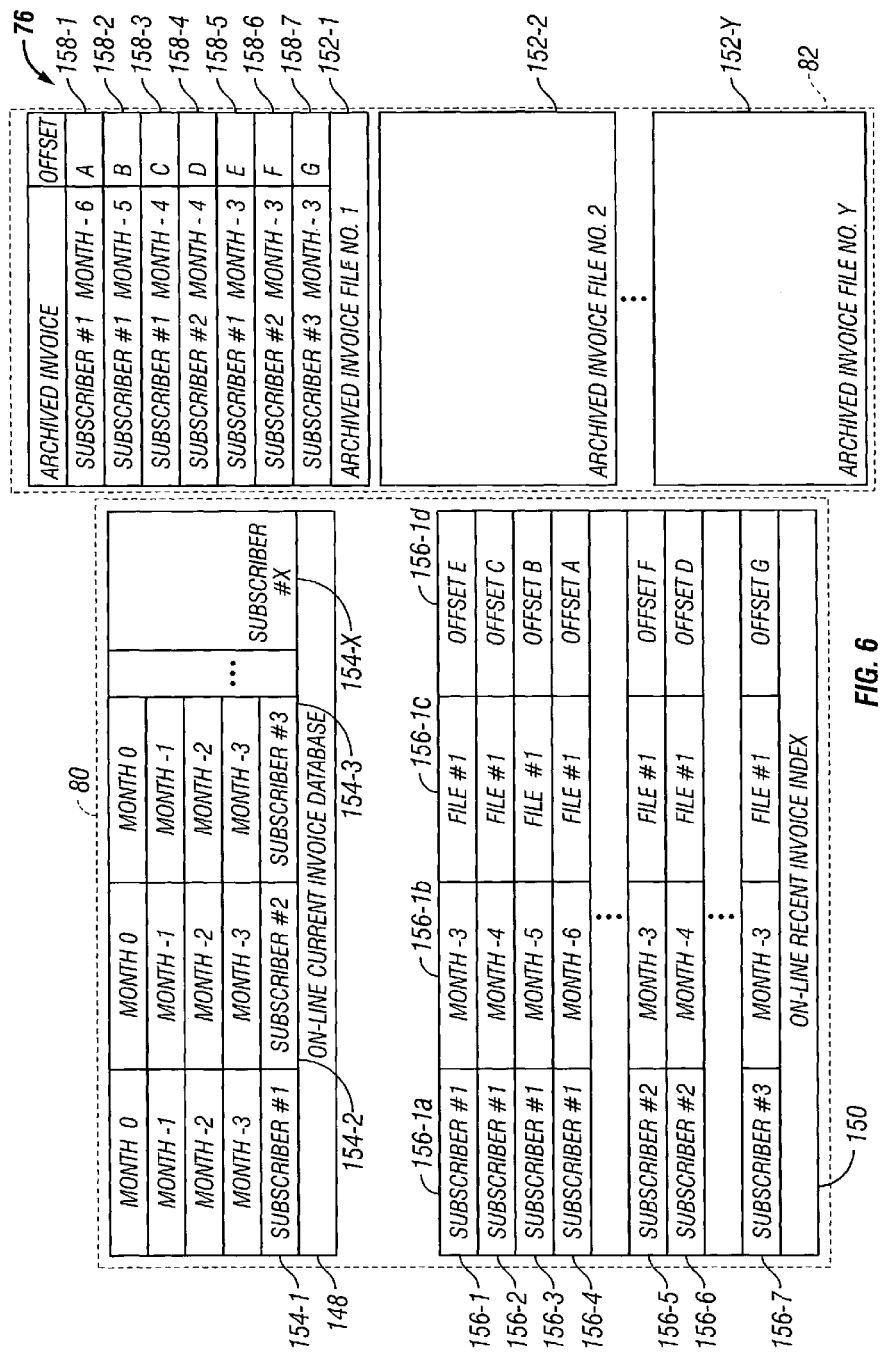
FIG. 6 is an expanded block diagram of a first data space of the on-line account management system of FIG. 3.

Referring next to FIG. 6, the upper tier 80 and the intermediate tier 82 of the first data space 76 will now be described in greater detail. As may now be seen, the upper tier 80 includes a first portion 148 which contains an on-line current invoice database and a second portion 150 which contains an on-line recent invoice index. The intermediate tier 82, on the other hand, includes plural portions 152-1 through 152-y, each of which contains an archived invoice file. As disclosed herein, the method of archiving and retrieving invoice information is configured such that first portion 148 of the upper tier 80 is to maintain three months of invoices (months "0" through "−2"), the intermediate tier 82 is to maintain nine months of invoices (months "−3" through "−11") and invoices more than one year old are to be maintained by the third tier 82. Of course, the foregoing periods of time for which invoices are to be maintained in the upper tier 80 and the intermediate tier 82 are purely exemplary and it is fully contemplated that any other suitable period may be selected instead.

As may be further seen in FIG. 6, the on-line current invoices maintained in the first portion 148 of the upper tier 80 are maintained in a database and arranged by subscriber, who, as previously set forth, is a customer of the service provider who has requested that their invoices be maintained on-line. Accordingly, the first portion 148 is sub-divided into plural entries 154-1 through 154-x, each of which corresponds to one of the subscribers for whom invoices are maintained on-line. Depending on when the subscribers initially requested that their invoices be maintained on-line, each one of the plural entries 154-1 through 154-x may hold a different numbers of months of invoices for the corresponding subscriber. For example, entries 154-1 through 154-3 all hold invoices for four months (one of which is, as will be more fully described below, has been identified as an excessively aged invoice, archived in the archived invoice file 152 of the intermediate tier 82 and is awaiting deletion from the on-line current invoice database 148 of the upper tier 80) while the entry 154-x holds invoices for only two months. Such a result would occur if the subscriber "x" has only recently requested that their invoices be available on-line.

The on-line recent invoice index 150 is comprised of plural entries 156-1 through 156-7, each of which corresponds to an invoice which has been removed from the on-line recent invoice database 148 of the upper tier 80 and archived in an available archived invoice file 152-1 through 152-y of the intermediate tier 82. More specifically, each time that the archival and retrieval application 72 identifies an excessively aged invoice to be removed from the on-line current invoice database 148 of the upper tier 80, the archival and retrieval application 72 creates an entry to be placed in the on-line recent invoice index 150. As disclosed herein, each entry contains four fields. For example, the entry 156-1 includes a first field 156-1a which identifies the subscriber for whom an excessively aged invoice is being removed from the on-line current invoice database 148 of the upper tier 80 for storage in one of the archived invoice files 152-1 through 152-y of the intermediate tier 82, a second field 156-1b which identifies the month of the invoice being archived, a third field 156-1c which identifies to which one of the archived invoice files 152-1 through 152-y that the invoice is being archived and a fourth field 156-1d which identifies the location, within that archived invoice file, of the invoice. For example, the entry 156-4 indicates that the invoice for month (−6) for subscriber 1 was archived in file 152-1 at offset A. To facilitate a determination as to which invoices have been archived for a particular subscriber, as disclosed herein, the entries 156-1 through 156-7 in the on-line recent invoice index 150 are arranged by subscriber. Thus, each time an entry is added to the on-line recent invoice index 150, the location of any other entries, within the index 150, for that subscriber is determined and the new entry added to the entries for that subscriber. Of course, to simplify construction of the index somewhat, the entries could be arranged in a chronological order corresponding to the order in which the excessively aged invoices were removed from the on-line current invoice database 148 of the upper tier 80 and archived in one of the archived invoice files 152-1 through 152-y of the intermediate tier 82.

Finally, each one of the archived invoice files 152-1 through 152-y includes plural invoices each at a discrete location within the file. As illustrated in FIG. 6, the invoice for month (−6) for subscriber 1 is at a first location 158-1, having an offset A, within the file 152-1. Similarly the invoice for month (−5) for subscriber 1 is at a second location 158-2 having an offset B, the invoice for month (−4) for subscriber 1 is at a third location 158-3 having an offset C, the invoice for month (−4) for subscriber 2 is at a fourth location 158-4 having an offset D, the invoice for month (−3) for subscriber 1 is at a fifth location 158-5 having an offset E, the invoice for month (−3) for subscriber 2 is at a sixth location 158-6 having an offset F and the invoice for month (−3) for subscriber 3 is at a seventh location 158-7 having an offset G, all within the file 152-1. As disclosed herein, each invoice is archived in the archived invoice file 152-1 of the intermediate tier 82 in the same order in which they were removed from the on-line current database 148 of the upper tier 80. Thus, the invoice for month (−6) for subscriber 1 was the first invoice to be archived while the invoice for month (−3) for subscriber 3 is the most recent invoice to be archived. As the invoices are removed from the on-line current invoice database 148 of the upper tier 80, the archival and retrieval application 72 adds the invoices to a selected archived invoice file, for example, the file 152-1, until that file is filled. The archival and retrieval application 72 would then select a next archived invoice file, for example, the file 152-2, for subsequent invoices selected for archival.

As illustrated in FIG. 6, the contents of the on-line current invoice database 148, the on-line recent invoice index 150 and the archived invoice files 152-1 through 152-y resulted from a particular situation where, initially, only subscriber 1 had requested that their invoices be placed on-line. Thus, the invoices for months (−6) and (−5), invoices for only subscriber 1 were placed in the on-line current invoice database 148 by the XML-format invoice generation application 68. At the same time, the archival and retrieval application 72 checked the contents of the on-line current invoice database 148 for excessively aged invoices. However, since all of the invoices maintained in the on-line current invoice database 148 were less than three months old, the archival and retrieval application 72 did not identify any excessively aged invoices requiring archival in the archived invoice files 152-1 through 152-y. Subscriber 2 then requested that their invoices also be placed on-line. Accordingly, invoices for month (−4) were placed in the on-line current invoice database 148 for both subscribers 1 and 2. Again, the archival and retrieval application 72 failed to identify any excessively aged invoices in the on-line current invoice database 148 requiring archival in the archived invoice files 152-1 through 152-y. In the following month, subscriber 3 also requested that their invoices be place on line. Accordingly, invoices for month (−3) were placed in the on-line current invoice database 148 for subscribers 1, 2 and 3 by the XML-format invoice generation application 68. During this pass, however, the archival and retrieval application 72 identified invoice (−6) for subscriber 1 as an excessively aged invoice, archived the identified invoice in the file 152-1 and added a corresponding entry to the on-line recent invoice index 150. In the months that followed: invoices for month (−2) for subscribers 1, 2 and 3 were added to the on-line current invoice database 148 while invoice (−5) for subscriber 1 was removed from the on-line current invoice database 148, archived in the file 152 and added as an entry in the on-line recent invoice index 150; invoices for month (−1) for subscribers 1, 2 and 3 were added to the on-line current invoice database 148, invoices for month (−4) for subscribers 1 and 2 were removed from the on-line current invoice database 148, archived in the file 152 and added as entries to the on-line recent invoice index 150; and invoices for month (0) for subscribers 1, 2 and 3 were added to the on-line current invoice database 148 while invoices for month (−3) were archived in the file 152 and added as entries to the on-line recent invoice index 150. It should be noted, however, that FIG. 6 is a "real-time" illustration of the contents of the upper and intermediate tiers 80 and 82 and that, having been archived in the file 152 and entered in the on-line recent invoice index 150, the invoice for month (−3) for subscribers 1, 2 and 3 are, in FIG. 6, awaiting deletion from the on-line current invoice database 148.

Figures 1, 7A:
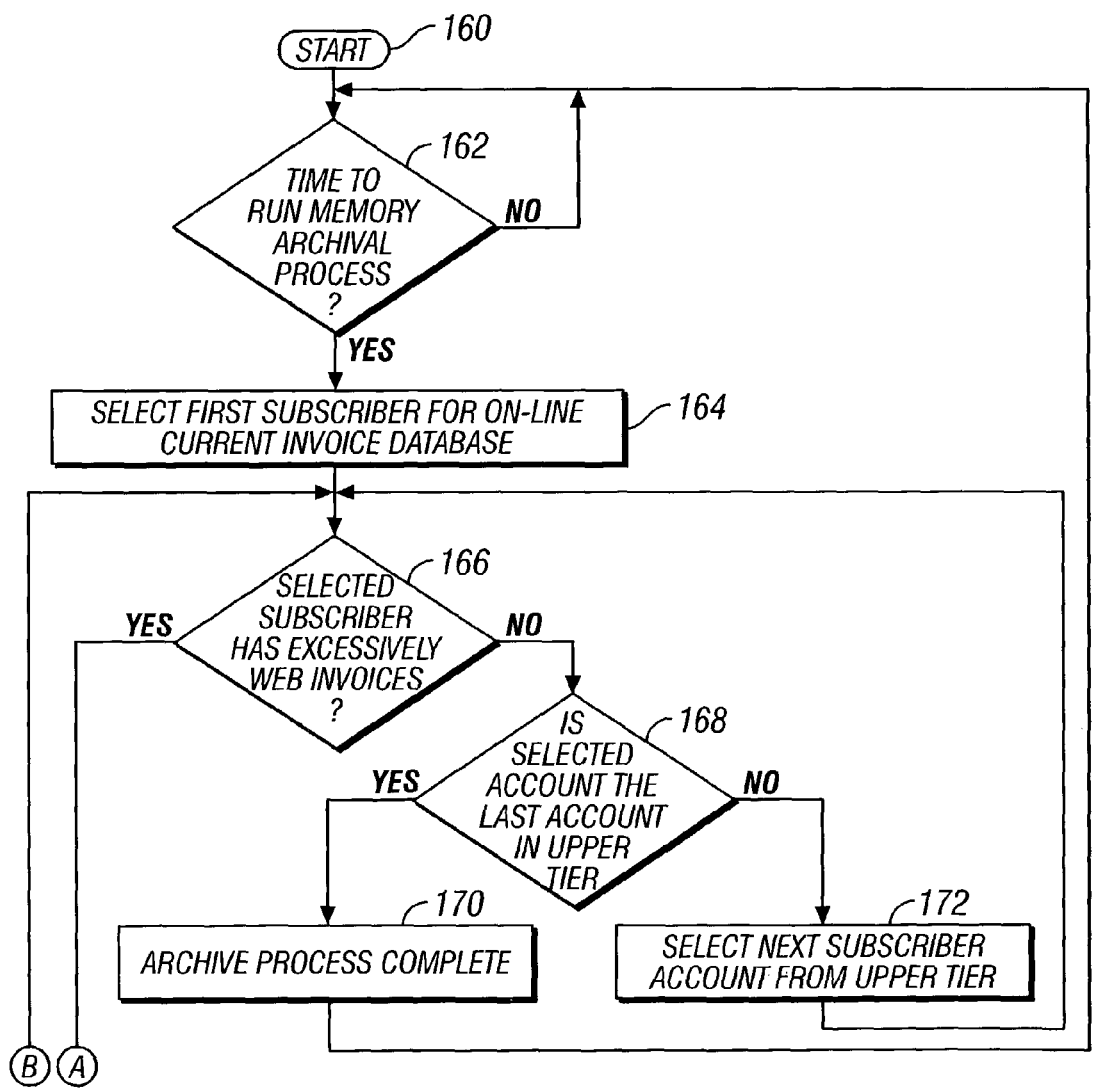
FIG. 7a is a flow chart illustrating a method of archiving invoice information to and retrieving invoice information from an intermediate tier of the first data space of FIG. 6.
Figures 2, 7A:
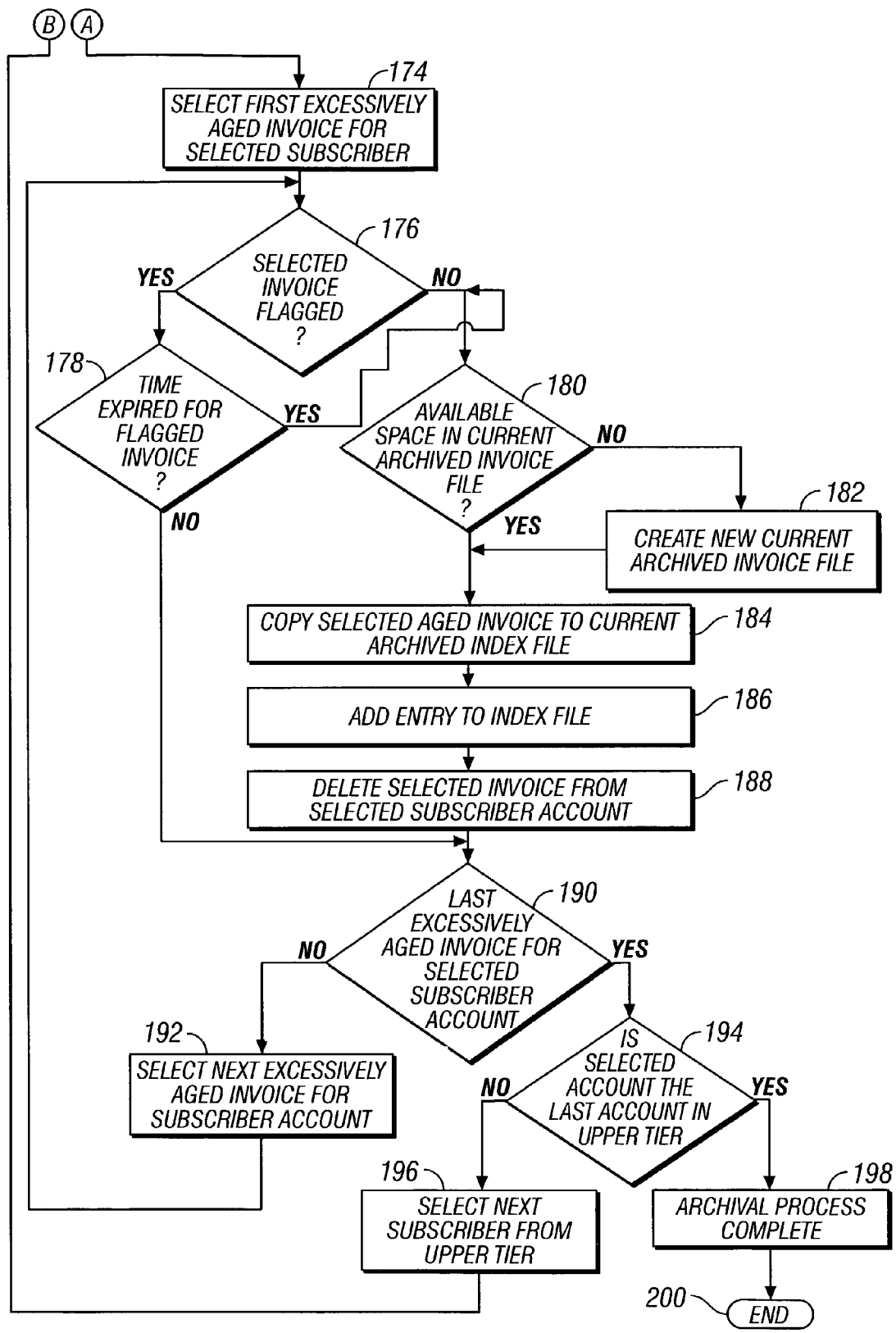
Figure 7B:
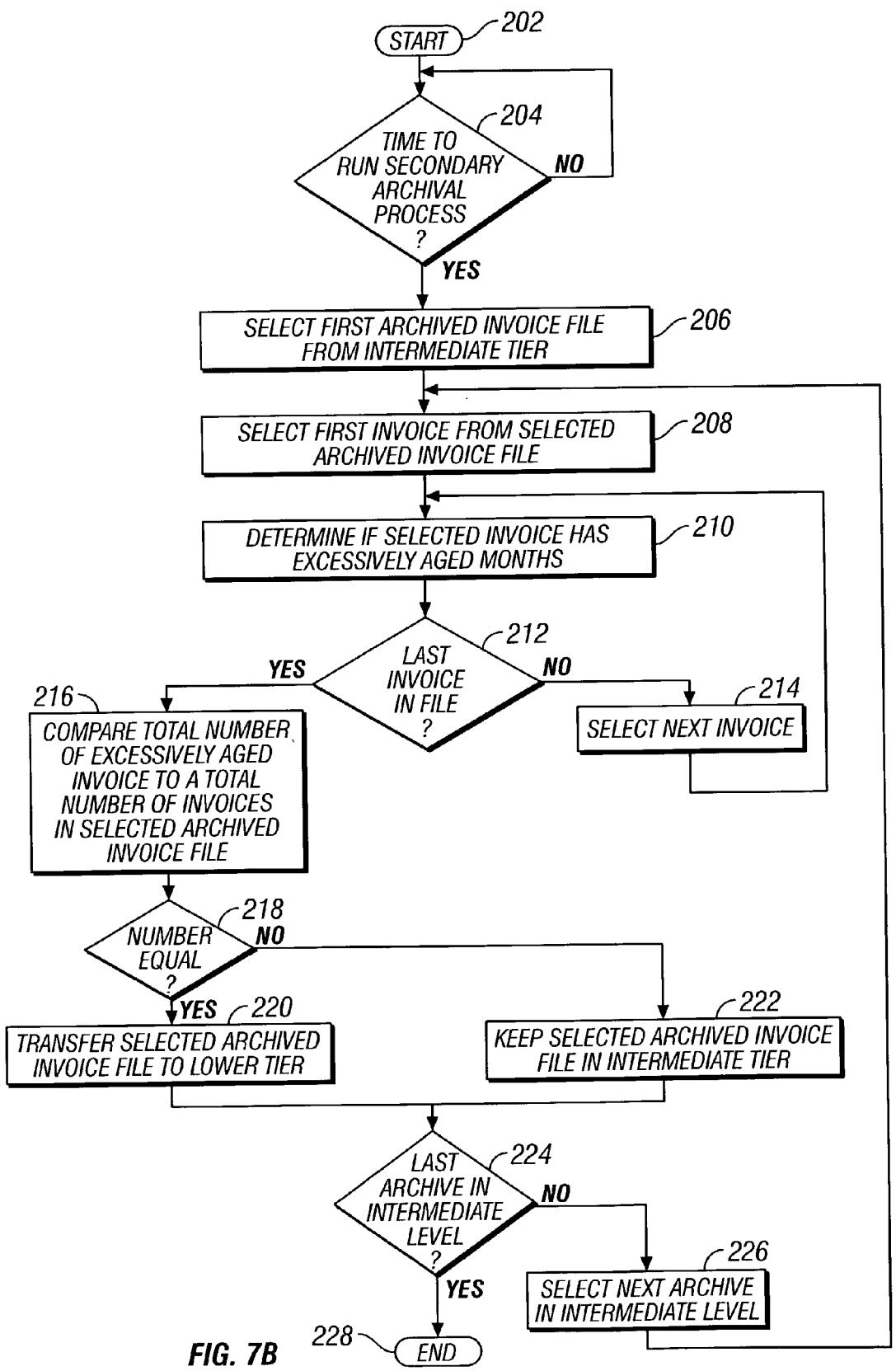
FIG. 7b is a flow chart illustrating a method of archiving invoice information to a lower tier of the first data space of FIG. 6.

Referring next to FIGS. 7a-b, a method of archiving on-line account information in accordance with the teachings of the present invention will now be described in greater detail. More specifically, in FIG. 7a, a primary archival method is shown and, in FIG. 7b, a secondary archival method is shown. Turning first to FIG. 7a, the primary archival method commences at step 160. At step 160, it is again presumed that the web server 20 is powered up and accessible to computer users, for example, a user of the computer system 14 via the Internet 12. It is further presumed that the archival and retrieval application 72 has been launched, configured and begun executing archival operations. Configuration information for the archival and retrieval application 72 may include the number of months of subscriber account information, for example, invoice information, that should be kept on-line, the size of each archive file to be filled with information removed from an on-line database, for example, the on-line current invoice database 148 which, as previously set forth, forms part of the upper tier 80 of the subscriber invoice data storage space 76, what time of day the archival process should run and the day on which the archive process should run. For example, the archival and retrieval application 72 may be configured to: a) keep three months of subscriber invoices in the on-line current invoice database 148 forming part of the upper tier 80 of the subscriber invoice data storage space 76; b) construct 2 MB archived invoice files, for example, the files 152-1 through 152-y; and c) run the archival process at noon on every Sunday. As disclosed herein, the archival process will be described with respect to one particular type of subscriber account information in one specific location within one particular device, specifically, the information stored in the subscriber invoice data storage space 74 of the memory subsystem 66 of the web server 20. It should be clearly understood, however, that, in further embodiments of the invention, the disclosed archival process may be applied to plural types of subscriber account information and/or plural data storage spaces of the memory subsystem 66. In those embodiments of the invention, the information to be archived from the plural discrete data storage spaces may variously be archived in corresponding plural discrete archive files or in a common archive file. It should be further understood that the disclosed techniques have a wide variety of applications other than those specifically recited herein.

Once launched, the method proceeds to step 162 where the archival and retrieval application 72 will check to determine if it is time to conduct a check of the on-line current invoice database 148 of the upper tier 80 of the subscriber invoice data storage space 76. If the archival and retrieval application 72 determines that the time of day and/or day of the week matches the time of day and/or day of the week at which the on-line current invoice database 148 is to be checked for excessively aged customer invoices, the method proceeds to step 152. If, however, the archival and retrieval application 72 determines that the time of day and/or day of the week does not match the time of day and/or day of the week when the on-line current invoice database 148 of the upper tier 80 is to be checked for excessively aged invoices, the method returns to step 162 where the time of day and/or day of the week are again checked. While, as disclosed herein, the on-line current invoice database 148 is checked at noon on every Sunday, it should be clearly understood that it is fully contemplated that any desired time of day and day of the week may be selected. It is further contemplated that the frequency at which the on-line current invoice database 148 is checked may be varied from the weekly check disclosed herein.

If the archival and retrieval application 72 determines at step 162 that it is time to check the on-line current invoice database 148 of the upper tier for excessively aged invoices, the method proceeds to step 164 where the archival and retrieval application 72 selects a first subscriber for examination. Proceeding on to step 166, the archival and retrieval application 72 determines the number of months of invoices which are maintained in the on-line current invoice database 148 for the selected subscriber. If it is determined at step 166 that the selected subscriber does not have an excess number of invoices, for example, three invoices, maintained in the on-line current invoice database 148, the archival and retrieval application 72 concludes that the on-line current invoice database 148 does not have any excessively aged invoices for the selected subscriber account and the method proceeds to step 168 for determination if there are additional subscribers in the on-line current invoice database 148 that need to be checked for excessively aged invoices. If all of the subscriber accounts in the on-line current invoice database 148 have been checked for excessively aged invoices, the method proceeds to step 170 where the archival and retrieval application 72 determines that the archival process is complete. The method then returns to step 162 to await a next execution of the archival process. If, however, it is determined at step 168 that there are additional subscribers to be examined for excessively aged invoices, the method proceeds to step 172 for selection of a next subscriber for the on-line current invoice database 148. The method then returns to step 162 for further processing of the newly selected subscriber in the manner previously described.

Returning now to step 166, if it is determined that the on-line current invoice database 148 for the selected subscriber has one or more excessively aged invoices, the method will proceed to step 174 to begin the process of archiving the excessively aged invoices. At step 174, a first excessively aged invoice for the selected subscriber is selected for examination. Proceeding on to step 176, the archival and retrieval application 72 determines whether a flag of the selected invoice has been set. If the flag of the selected invoice has been set, the archival and retrieval application 72 determines that the entry is an excessively aged invoice which was previously restored to the on-line current invoice database 148 as part of a prior restoration of aged invoices to the subscriber's account information. If the flag is not set, however, the archival and retrieval application 72 determines that the selected entry is an excessively aged invoice which has remained in the on-line current invoice database 148 for an excessive period of time.

Accordingly, if the flag for the selected entry is set, the method proceeds to step 178 where the archival and retrieval application 72 determines if time has expired for the flagged entry. More specifically, an aged invoice is restored to the on-line current invoice database 148 for a specified period of time and, upon expiration of the specified period of time, the restored invoice will again be deleted from the on-line current invoice database 148. The specified period of time is selected in order to enable the user requesting the restoration of the aged invoice sufficient time to print off or otherwise examine the aged invoice. For example, two weeks has proven suitable as the specified period of time. Variously, the specified time period may be selected during by a system administrator, for example, during the initial configuration of the archival/retrieval application 72 or may be selected by the user immediately prior to the restoration of the selected aged invoice. The specified period of time may also be tied to the charge associated with the restoration of the aged invoice to the on-line current invoice database 148. For example, the service provider may charge the user a lower restoration fee if the restored invoice is to be kept on-line for only two weeks and a higher restoration fee if the restored invoice is to be kept on line for two months.

Returning to step 176, if it is determined at step 176 that the selected aged invoice for the selected subscriber is not flagged or if it is determined at step 178 that time has expired for the flagged entry, the archival and retrieval application 72 concludes that the selected excessively aged invoice is to be deleted. Accordingly, the method proceeds to step 180 to begin deletion of the selected invoice. At step 180, the archival and retrieval application 72 determines if there is enough space available in the archived invoice file currently being used for the archival of invoices, for example, in FIG. 6, the file 152-1 of the intermediate tier 82 of the subscriber invoice data storage space 76, for the selected excessively aged invoice. If sufficient space for the selected excessively aged invoice is available in the current archived invoice file 152-1 of the intermediate tier 82, the method proceeds to step 184 for further processing. If, however, it is determined at step 180 that there is not enough available space in the current archived invoice file 152-1 for the selected aged invoice, the archival and retrieval application 72 concludes that the current archived invoice file 152-1 of the intermediate tier 82 is filled. The method will then proceed to step 182 where a new current archived invoice file is created within the intermediate tier 82, for example, in FIG. 6, the file 152-2. The method will then proceed to step 184 for further processing. Of course, rather than creating a new file within the intermediate tier 82 only when the prior file is filled, in an alternate aspect of the invention, it is contemplated that plural files may be created initially for later filling with excessively aged invoices.

Having ensured that there is sufficient space in the current archived invoice file, for example, the file 156-1, for the selected excessively aged invoice to be deleted from the on-line current invoice database 148, at step 184, the archival and retrieval application 72 generates a copy of the selected excessively aged invoice of the on-line current invoice database 148 of the upper tier 80, compresses the copy of the excessively aged invoice and then writes the compressed copy of the selected excessively aged invoice to the current archived invoice file 156-1 of the intermediate tier. Continuing on to step 186, an entry describing the selected excessively aged invoice which has now been compressed and copied into the current archived invoice file 156-1 is created and added to the on-line recent invoice index 150. As previously set forth, the created entry includes a first field which holds a unique identifier of the subscriber, for example, the subscriber's name and/or account number, a second field which holds the month of the selected excessively aged invoice, a third field which identifies, within the intermediate tier 82 of the subscriber invoice data storage space 76, the archived invoice file where the selected excessively aged invoice has been archived and a fourth field which identifies the specific location, within the temporary upper tier archive file, where the selected excessively aged invoice is maintained. After added an entry identifying selected excessively aged invoice and its location to the on-line recent invoice index 150, the method proceeds to step 188 where the archival and retrieval application 72 deletes the selected excessively aged invoice from the selected subscriber account of the on-line current invoice database 148.

Upon deleting the selected aged invoice from the selected subscriber account of the on-line current invoice database 148 at step 188 or upon determining that the time which a flagged restored invoice is to be maintained in the selected subscriber account of the on-line current invoice database 148 at step 178, the method proceeds to step 190 where the archival and retrieval application 72 determines if the selected excessively aged invoice is the last excessively aged invoice for the selected subscriber. If it is determined at step 190 that there are additional excessively aged invoices for the selected subscriber to be examined for possible archival, the method proceeds to step 192 where the archival and retrieval application 72 selects a next excessively aged invoice for the selected subscriber account. The method then returns to step 176 for further processing in the manner previously described.

If, however, the archival and retrieval application 72 determines at step 190 that there are no further excessively aged invoices for the selected subscriber to be examined, the method will proceed to step 194 where the archival and retrieval application 72 determines if the selected subscriber account is the last subscriber account in the on-line current invoice database 148 in the upper tier 80 to be examined for excessively aged invoices. If the archival and retrieval application 72 determines that there are additional subscriber accounts to be examined, the method proceeds to step 196 for selection of a next subscriber account from the on-line current invoice database 148 of the upper tier 82 for examination. The method then returns to step 166 for further processing in the manner previously described. If, however, it is determined at step 194 that all of the invoices for subscribers for which invoices are maintained in the on-line current invoice database 148 have been examined for excessively aged invoices, the method will instead proceed to step 198 where the archival and retrieval application 72 determines that the archival process is complete. The method will then end at step 200.

Of course, the primary archival process hereinabove described represents a single pass through the on-line current invoice database 148. However, it should be clearly understood that, once launched, the archival and retrieval application 72 will repeatedly execute the archival process disclosed herein. The frequency at which the archival and retrieval application 72 will execute the archival process is controlled by a pre-selected time period designated during configuration of the archival and retrieval application 72. Accordingly, unless the archival and retrieval application 72 is closed, upon completion of the archival process at step 200, the method will return to step 160 to again execute the archival process in the manner previously described.

Unlike the archival process, the retrieval process is executed manually. As previously set forth, for any given subscriber, three months of invoices are maintained in the on-line current invoice database 148 of the upper tier 80 of the subscriber invoice data storage space 76 while compressed copies of an additional nine months of invoices are maintained in the archived invoice files 152-1 through 152-y maintained in the intermediate tier 80 of the subscriber invoice data storage space 76 and any earlier invoices are maintained in the lower tier 84 of the subscriber invoice data storage space. To view the invoices maintained in the upper tier 82, a subscriber would initiate an access of those invoices over the Internet 12 via the account management application 74 of the web server 20. If the subscriber wanted to view older invoices no longer maintained in the upper tier 84, at the subscriber's request, the account management application 74 would issue a retrieval request to the archival and retrieval application 72 identifying the invoices to be retrieved. The account management application 74 would compare the invoices to be retrieved to those listed in the on-line recent invoice index 150. If the requested invoices are listed in an entry of the on-line recent invoice index 150, the archival and retrieval application 72 would retrieve the invoices from the intermediate tier 82 using the locational information contained in the entry, decompress the retrieved invoices and write the decompressed invoices to the upper tier 80. The archival and retrieval application 72 would also set a flag on each retrieved invoice which controls the time which that invoice can remain in the upper tier 80. The archival and retrieval application 72 would then notify the account management application 74 that the requested invoices were available on-line and the account management application 74 would notify the subscriber of the same. If, however, the requested invoices were not listed in the on-line recent invoice index 150, the archival and retrieval application 72 would issue a request for manual retrieval of the invoice from the lower tier 84 of the subscriber invoice data storage space 76 and would notify the account management application of the expected delay in making the requested invoice available on-line.

Referring next to FIG. 7b, a secondary archival process in which invoices which have been deleted from the on-line current invoice database 148 of the upper tier 80 and archived in the archived invoice files 152-1 through 152-y of the intermediate tier are periodically selected for archival in the lower tier 84 will now be described in greater detail. Unlike the primary archival process which runs automatically once the archival and retrieval application 72 is launched, the secondary archival process must be run manually. The method commences at step 202 and, at step 204, the method determines if it is time to run the secondary archival process. Any suitable period, for example, six months, may be selected as the frequency at which to run the secondary archival process. Upon reaching the appropriate time to run the secondary archival process, the method will proceed to step 206 where a first archived invoice file, for example, the archived invoice file 152-1, is selected for further examination. At step 208, a first invoice, for example, the invoice 158-1, is selected from the selected archived invoice file for further examination. At step 210, the method determines if the selected invoice is excessively aged. Of course, for purposes of the secondary archival process, an excessively aged invoice is one that has aged twelve months.

In accordance with the method, a count of the total number of invoices in the selected archived invoice file and the number of excessively aged invoices in the selected archived invoice file are maintained. Accordingly, at step 210, the count of the total number of invoices in the selected archived invoice file is incremented by one and, if the selected invoice is determined to be excessively aged, the count of excessively aged invoices is also incremented by one. After incrementing one or both counts appropriately, the method proceeds to step 212 where it is determined if the selected invoice is the last invoice in the selected archived invoice file. If there are additional invoices in the selected archived invoice file to be examined, the method continues on to step 214 for selection of a next invoice and then returns to step 210 for further processing in the manner previously described.

If, however, it is determined at step 212 that all of the invoices in the selected archived invoice file have been examined, the method will instead proceed to step 216 where the total number of excessively aged invoices in the selected archived invoice file is compared to the total number of invoices in the selected archived invoice file. Continuing on to step 218, if the total number of excessively aged invoices in the selected archived invoice file is determined to be equal to the total number of invoices in the selected archived file, the method classifies the selected archived invoice file as an excessively aged archived invoice file and the method will proceed to step 220 where a computer user will transfer the selected invoice archive file from the intermediate tier 82 to the lower tier 84 by conventional means. If, however, it is determined at step 218 that the number of excessively aged invoices in the selected archived invoice file is not equal to the total number of invoices in the selected archived file (typically, because the number of excessively aged invoices is less than the total number of invoices), the method determines that the selected archived invoice file has not become excessively aged and should not be transferred to the lower tier 84 of the subscriber invoice data storage space 76. Accordingly, the method will instead proceed to step 222 where the selected archived invoice file will be kept in the intermediate tier 82. Of course, rather than requiring a 1:1 ratio of the number of excessively aged archived invoices to match the number of archived invoices before selecting the archived invoice file for transfer to the lower tier 84, it is fully contemplated that other ratios may be equally suitable for the purposes contemplated herein. For example, if 90% of the invoices archived in an archived invoice file are excessively aged, it may be suitable to transfer the archived invoice file to the lower tier 84.

Continuing on to step 224, it is determined if there are additional archived invoice files in the intermediate tier 84 to be examined for possible transfer to the lower tier 86, the method proceeds to step 226 for selection of a next archived invoice file and then returns to step 208 for further processing in the manner previously described. If, however, it is determined at step 224 that all of the archived invoice files in the intermediate tier 84 have been examined, the method ends at step 228. As before, however, the secondary archival process hereinabove described represents a single pass through the archived invoice files maintained in the intermediate tier 82 and, after completion of the secondary archival process at step 200, the method will return to step 202 to again execute the secondary archival process in the manner previously described Thus, there has been described and illustrated herein, a system and method for synchronizing account information available on-line with account information maintained internally by a provider of goods or services which, by limiting transfers between the internal and on-line data storage locations to updates, the volume of traffic resulting from the synchronization process is reduced. However, those skilled in the art should recognize that numerous modifications and variations may be made in the techniques disclosed herein without departing substantially from the spirit and scope of the invention. Accordingly, the scope of the invention should only be defined by the claims appended hereto.

What is claimed is:

1. A method of synchronizing account records of customers maintained on a first computer system witty-account records of a set of said customers maintained on a second computer system coupled to said first computer system wherein said set of said customers have subscribed for viewing of account records over a network and said second computer system is accessible to said set of customers over a network for viewing said account records maintained on said second computer system, comprising:

said first computer system constructing a baseline account records data file using current account records and a list of said set of said customers, wherein each of said current account records which correspond with a customer on said list is added as a baseline account record of the baseline account records data file;

said first computer system transmitting the baseline account records data file to said second computer system;

said second computer system said received baseline account record data file as a current account records database;

said first computer system constructing an updates file from additional account records information obtained subsequent to said transmission of baseline account records data file to said second computer system, said updates file comprised of updated account information for each of said set of said customers for which a change in said current account information maintained in said baseline account records data file is detected;

said first computer system transmitting said updates file to said second computer system; and said second computer system updating said current account records database using said updated account information contained in said updates file, wherein constructing an updates file from additional account information obtained subsequent to said transmission of said baseline account records data file to said second computer system further comprise:

said first computer system identifying updated account information by comparing said baseline account records data file to an account records data file constructed using updated account information; and said first computer system constructing said updates file from said identified updated account information.

2. For a provider of goods or services to customers, a method of synchronizing account records maintained on a first computer system with account records maintained on a second computer system coupled to said first computer system, said second computer system accessible to said customers over a network wherein said account records maintained on said second computer system are viewable by said customers of said provider that access said second computer system over said network, comprising:

said first computer system transmitting a baseline account records data file to said second computer system, said baseline account records data file containing; current account information for at least one customer of said provider;

said second computer system maintaining said received baseline account records data file as an on-line account records database suitable for viewing by said at least one customer over said network;

said first computer system constructing an updates file from additional account information obtained subsequent to said transmission of said baseline account records data file to said second computer system, said updates file comprised of updated account information for each one of said at least one customer of said provider for which a change in said current account information maintained in said baseline account records data file is detected by said first computer system;

said first computer system transmitting said updates file to said second computer system; and said second computer system updating said on-line account records database using said updated account information contained in said updates file, wherein constructing an updates file from additional account information obtained subsequent to said transmission of said baseline account records data file to said second computer system further comprises:

said first computer system identifying updated account information by comparing said baseline account records data file to an updated account records data file; and said first computer system constructing said updates file from said identified updated account information.

3. The method of claim 2, and further comprising:
- said first computer system constructing said baseline account records data file from a current A/R data file for said customers of said provider and a list of those customers who have subscribed, with said provider, for on-line viewing of account records; and
- said customers who have subscribed for on-line viewing of account records being a subset of said customers of said provider.

4. The method of claim 3, wherein said first computer system is a mainframe computer, said second computer system is a web server, said mainframe computer is coupled to said web server by an enterprise network operated by said provider and said account records maintained on said web server are viewable, over the Internet, by said customers who have subscribed for on-line viewing of account records.

5. The method of claim 4, wherein said account records are records of accounts receivable for said provider.

6. A computer network, comprising:
- a first computer system, said first computer system having a first memory subsystem in which a current account records data file is maintained and a first processor subsystem coupled to said first memory subsystem; and
- a second computer system coupled to said first computer system, said second computer system having a second memory subsystem in which a current account records data file is maintained and a second processor subsystem coupled to said second memory subsystem;
- said first computer system further including a first synchronization application residing on said first processor subsystem, said first synchronization application initiating synchronization of said current account records data file maintained in said second memory subsystem of said second computer system with said current account records data file maintained in said first memory subsystem of said first computer system such that said current account records data files mirror one another;
- said second computer system further including an account management application residing on said second processor subsystem, said account management application enabling customers to view account records contained in said current account records data file maintained in said second memory subsystem of said second computer system and synchronized with corresponding account records contained in said current account records data file maintained in said first memory subsystem of said first computer system;
- wherein said second computer system further includes a second synchronization application residing on said processor subsystem;
- said first memory subsystem of said first computer system further maintains a subscriber data file containing a list of customers of a provider of goods or services who have subscribed, with said provider, for on-line viewing of selected ones of said account records contained in said current account records data file maintained in said second memory subsystem of said second computer system;
- said first synchronizing application determining a baseline account records data file from said list of subscribers contained in said subscriber data file and current A/R records for said customers of said provider;
- said first synchronizing application writing said baseline account records data file to said current account records data file of said first memory subsystem of said first computer system and transmitting said baseline account records data file to said second synchronizing application; and
- said second synchronizing application writing said baseline account records data file to said current account records data file of said second memory subsystem of said second computer system, wherein:
- said first memory subsystem of said first computer system further maintains a prior account records data file, said first synchronizing application copying said current account records data file to said prior account records data file upon construction of a next current account records data file from said list of subscribers and a next current A/R data file which contains A/R transactions received subsequent to said first synchronizing application transmitting said baseline account records data file to said second synchronizing application; and
- said first synchronizing application determining updates to said current account records data file by comparing said current account records data file to said prior account records data file.

7. The apparatus of claim 6, wherein said memory subsystem of said first computer system further maintains an updated account records data file, said first synchronizing application writing said determined updates to said current account records data file to said updated account records data file.

8. The apparatus of claim 7, and further comprising:
- said first synchronizing application transmitting said updated account records data file to said second synchronization application; and
- said second synchronizing application updating said current account records data file maintained in said second memory subsystem of said second computer system using said updated current accounts data file transmitted thereto by said first synchronizing application.

9. The apparatus of claim 8, wherein said first computer system is a mainframe computer, said second computer system is a web server, said mainframe computer is coupled to said web server by an enterprise network operated by said provider and said account records maintained on said web server are viewable, by customers of said provider who have subscribed, with said provider, for on-line viewing of selected ones of said account records contained in said current account records data file, over the Internet.

10. The apparatus of claim 9, wherein said account records contained in said current account records data file maintained in said second memory subsystem of said second computer system are accounts receivable records for said provider.

* * * * *